United States Patent [19]

Maxwell

[11] Patent Number: 5,805,810
[45] Date of Patent: Sep. 8, 1998

[54] APPARATUS AND METHODS FOR CONVERTING AN ELECTRONIC MAIL TO A POSTAL MAIL AT THE RECEIVING STATION

[76] Inventor: Robert L. Maxwell, 4608 Dolphin Cay La., St. Petersburg, Fla. 33711

[21] Appl. No.: 432,430

[22] Filed: Apr. 27, 1995

[51] Int. Cl.[6] .................................................. G06F 17/00
[52] U.S. Cl. ................................ 395/200.36; 395/200.3; 395/200.62; 395/683; 364/DIG. 1
[58] Field of Search ............................. 395/800, 200.01, 395/800.01, 200.3, 200.62, 200.36, 683; 364/DIG. 1

[56] References Cited

U.S. PATENT DOCUMENTS

| | | | |
|---|---|---|---|
| 4,106,060 | 8/1978 | Chapman, Jr. | 358/402 |
| 4,207,598 | 6/1980 | Reich et al. | 379/100.09 |
| 4,264,782 | 4/1981 | Konheim | 380/25 |
| 4,371,752 | 2/1983 | Matthews et al. | 379/89 |
| 4,581,486 | 4/1986 | Matthews et al. | 379/88 |
| 4,602,129 | 7/1986 | Matthews et al. | 379/88 |
| 4,652,700 | 3/1987 | Matthews et al. | 379/89 |
| 4,797,832 | 1/1989 | Axelrod et al. | 364/478.15 |
| 4,800,506 | 1/1989 | Axelrod et al. | 364/478.15 |
| 4,837,798 | 6/1989 | Cohen et al. | 379/88 |
| 4,853,569 | 8/1989 | Durst, Jr. et al. | 364/478.15 |
| 4,862,386 | 8/1989 | Axelrod et al. | 707/507 |
| 4,896,261 | 1/1990 | Nolan | 395/287 |
| 4,962,532 | 10/1990 | Kasiraj et al. | 380/25 |
| 4,972,461 | 11/1990 | Brown et al. | 379/67 |
| 4,994,985 | 2/1991 | Cree et al. | 395/200.36 |
| 5,017,917 | 5/1991 | Fisher et al. | 340/825.79 |
| 5,040,141 | 8/1991 | Yazima et al. | 395/200.36 |
| 5,050,078 | 9/1991 | Sansone | 705/36 |
| 5,051,914 | 9/1991 | Sansone et al. | 364/478.11 |
| 5,057,935 | 10/1991 | Williams | 358/402 |
| 5,058,030 | 10/1991 | Schumacher | 364/478.08 |
| 5,060,165 | 10/1991 | Schumacher et al. | 364/478.01 |
| 5,068,797 | 11/1991 | Sansone et al. | 364/478.07 |
| 5,072,401 | 12/1991 | Sansone et al. | 364/478.07 |
| 5,077,694 | 12/1991 | Sansone et al. | 455/38.1 |
| 5,077,830 | 12/1991 | Mallia | 395/200.45 |
| 5,093,918 | 3/1992 | Heyen et al. | 395/200.36 |
| 5,109,519 | 4/1992 | Zimmet et al. | 395/200.36 |
| 5,127,087 | 6/1992 | Kasiraj et al. | 358/296 |
| 5,130,806 | 7/1992 | Reed et al. | 750/458.1 |
| 5,202,834 | 4/1993 | Gilham | 705/404 |
| 5,210,869 | 5/1993 | Williams | 395/185.01 |

(List continued on next page.)

FOREIGN PATENT DOCUMENTS

| | | |
|---|---|---|
| A4402856 | 8/1995 | Germany . |
| WO9101608 | 2/1991 | WIPO . |
| WOA9423383 | 10/1994 | WIPO . |

OTHER PUBLICATIONS

IBM Technical Disclosure Bulletin, vol. 36, No. 4, Apr. 1993, New York, US, pp. 507–508, XP002008452.

Office Equipment and Methods, Jun. 1987, Canada, vol. 33, No. 5, ISSN 0709–5228, pp. 47–48, XP000576842.

IBM Technical Disclosure Bulletin, vol. 33, No. 7, Dec. 1990, New York, US, pp. 479–480, XP002008453.

*Primary Examiner*—Daniel H. Pan
*Assistant Examiner*—Dzung C. Nguyen
*Attorney, Agent, or Firm*—Fulwider Patton Lee & Utecht, LLP

[57] ABSTRACT

A method of generating mail objects from email messages. The method is performed by a computer system having at least one database containing identifiers for senders of email messages, identifiers for corresponding recipients of mail objects, and address information for both the senders and recipients. The method is broadly comprised steps of three steps: (1) receiving an email message from a sender; (2) locating in the database an identifier for the sender and an identifier for a recipient specified in the email message; and (3) generating a mail object from the email message using the address information in the database for the sender and for the recipient.

102 Claims, 11 Drawing Sheets

U.S. PATENT DOCUMENTS

| | | | |
|---|---|---|---|
| 5,239,577 | 8/1993 | Bates et al. | 379/201 |
| 5,285,203 | 2/1994 | Nakano | 340/827 |
| 5,291,302 | 3/1994 | Gordon et al. | 358/400 |
| 5,293,250 | 3/1994 | Okumura et al. | 358/402 |
| 5,325,310 | 6/1994 | Johnson et al. | 395/200.36 |
| 5,333,266 | 7/1994 | Boaz et al. | 395/200.36 |
| 5,339,156 | 8/1994 | Ishii | 358/402 |
| 5,339,361 | 8/1994 | Schwalm et al. | 380/23 |
| 5,349,636 | 9/1994 | Irribarren | 379/89 |
| 5,426,594 | 6/1995 | Wright et al. | 364/514 |
| 5,438,433 | 8/1995 | Reifman et al. | 358/468 |
| 5,513,117 | 4/1996 | Small | 364/479 |

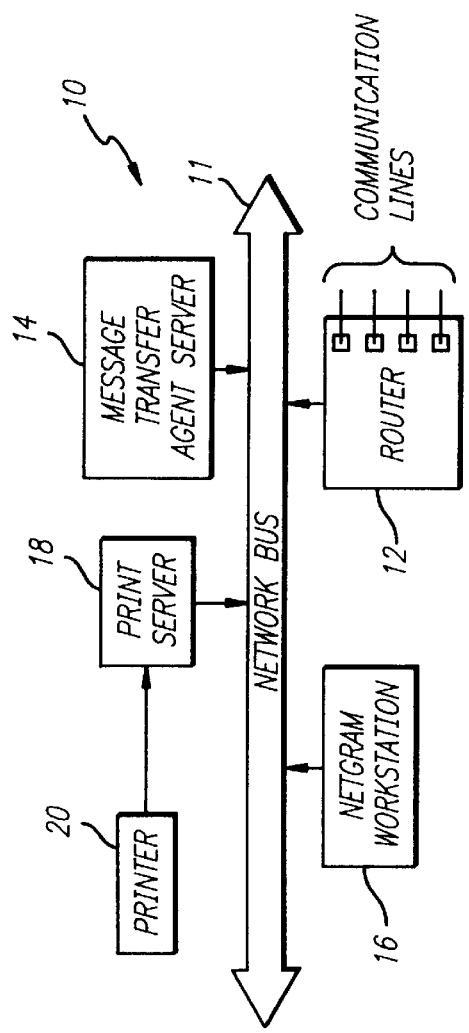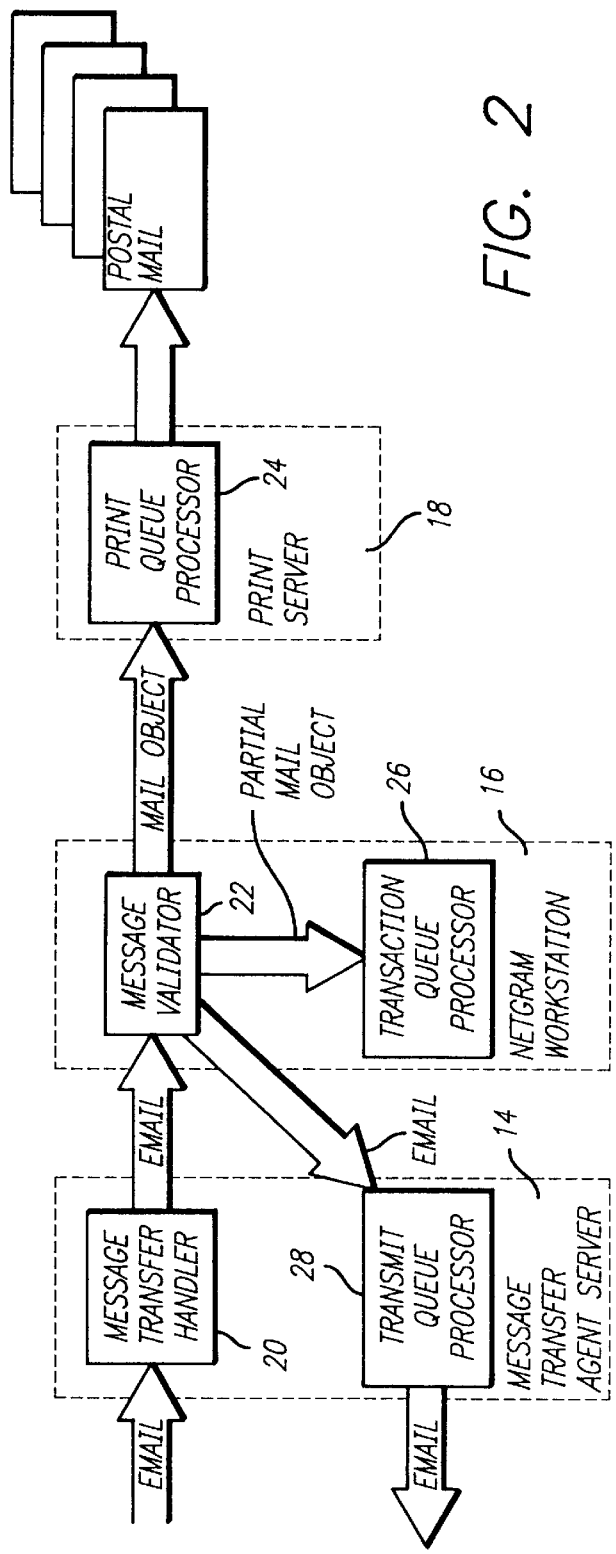

FIG. 14

RECIPIENT DATABASE — 1400

| SENDER ID | SENDER ADDRESS | RECIPIENT NICKNAME ID | RECIPIENT ADDRESS | RECIPIENT NAME |
|---|---|---|---|---|
| Jeff @ finnegan.com | 8141 TREVOR PLACE VIENNA, VA 22182 | mom @ Netgram.com | 67 SINGLAIR DR. WAYNE, N.J. 07470 | MARCIA BARIS |
| Txs @ Fame.com | 467 COLUMBUS AVE. N.Y. N.Y. 1005 | mom @ Netgram.com | 9 LILLIAN COURT WAYNE, N.J. 07410 | MIRIAM STRUHL |
| MLBach @ aol.com | 1300 I ST., N.W. WASH. D.C. 20005 | dad @ Netgram.com | 300 WINSTON AVE. SAN MARINO, CA | LEONARD GROSS |
| jeff @ finnegan.com | 8141 TREVOR PLACE VIENNA, VA 22182 | Ted @ Netgram.com | 467 COLUMBUS AVE. N.Y. N.Y. 10005 | TED STRUHL |
|   |   |   |   |   |

1410  1420  1430  1440  1450

1460

APPARATUS AND METHODS FOR CONVERTING AN ELECTRONIC MAIL TO A POSTAL MAIL AT THE RECEIVING STATION

BACKGROUND OF THE INVENTION

1. Field of the Invention

The present invention relates to an apparatus and methods for generating postal mail (also known as "snail mail") from electronic mail ("email") messages. More particularly, the present invention relates to an apparatus and methods for receiving email messages and generating postal mail from the email messages. While the invention is subject to a wide range of applications, it is especially suited for use with email messages from the Internet, and will be particularly described in that connection.

2. Description of the Related Art

Recently the computer industry has experienced rapid growth and development in three distinct areas of computer technology, which, as a result of this development, are now intertwined. The first of these areas is electronic mail ("email") messaging technology. Email technology generally permits one computer user (i.e., a sender) to compose an electronic message and send it to another computer user (i.e., a recipient) via telephone or network interconnection.

Much of the growth in the email technology may also be attributable to growth in a second area: networks. A network may be defined as more than one computer connected together by, for example, a cable or connection known as a network bus. A typical network includes one computer that is a "server" for all other computers connected to the network bus. The server is responsible for functions such as memory management and communication in the network. The server permits a user on one computer connected to the network (the sender) to send an email message to another user of the same or a different computer connectable to the network (the recipient). The term "connectable" implies that the recipient may not currently be connected to the network. In this case, the server stores the email message until it can be viewed by the recipient. When the recipient connects to the network, the server completes delivery of the email message to the recipient, who then may view the message.

One such network, which permits users on different computers to communicate, has become known as the Internet. The Internet is a "network of networks," consisting of multiple networks connected together by, for example, high-speed telephone lines or other types of communication lines. A general introduction to the Internet is contained in "The Whole Internet User's Guide & Catalog," by Ed Krol (O'Reilly & Associates, Inc., 2nd Ed. 1992).

The various networks that comprise the Internet may not always be connected. For certain services like email message transferring, the networks will periodically connect (via telephone lines or similar communication lines) and, if they have email messages to exchange, such exchange will be done during the connection. Subsequently, the networks will disconnect until a predetermined time period has elapsed or there are email messages to be transferred. Each of the networks connectable to and forming the Internet includes a message transfer agent ("MTA") responsible for the email message management functions.

The Internet permits users all over the world to communicate and share information. For example, a scientist in Brussels can communicate and collaborate with a scientist in the United States simply by exchanging email messages. The scientist in Brussels can compose email messages, including the "identity," i.e., network address, of the scientist in the United States, and provide the messages to an MTA located, for example, locally in Brussels. Either directly or via other intermediate networks, the Brussels-MTA will transfer the first scientist's email message to an MTA identified in the email message as part of the network address of the scientist in the United States.

Internet email messages are sent using a specific address structure to identify the recipient. In particular, this address structure, which is dictated by the Domain Name System of the Internet, requires a unique identifier for the recipient and a unique name for the MTA for the recipient. For example, "MLBach@finnegan.com" identifies "MLBach" as the email recipient and "finnegan" as the identity of an MTA for MLBach. The remaining portion of the address ".com" is used to identify the type of MTA. "Com" refers to a commercial MTA. Other types of MTAs include educational institution (".edu") and government agencies (".gov").

The last area of computer technology that has experienced enormous growth is that of "on-line services," such as CompuServe, GENIE, Prodigy, and America Online. On-line service providers permit users on personal computers to connect by telephone or other communication line to a central computer system (including one or more computers) that provides a variety of information services. These services include email message services that enable on-line service users to send and receive email messages to/from other users of the on-line service. Some on-line services also include the capability for their users to send and receive email messages from users of other on-line services via the Internet. For this to be possible, both on-line service providers must have Internet access.

But access to the Internet is not limited to users of on-line service providers. The Internet is accessible by many users of computer systems associated with institutions as well. For example, professors in universities may use their university's computer network, connected to the Internet, to communicate and conduct research. Employees of corporations may use their corporate computer network, connected to the Internet, to communicate and exchange data. Internet service providers also permit users access to the Internet, including the capability to exchange and manage email messages.

A number of on-line service providers have recognized a need for bridging email message technology with ordinary postal service since not all individuals have access to an on-line service. At least one such on-line service provider, i.e., America Online, Inc. of Vienna, Va., U.S.A., now permits users to send an email message to an individual that is not an on-line service user. The service provider generates a postal mail (i.e., a paper letter) printed with the contents of the email message, places the paper letter in an envelope addressed in accordance with the email message sender's instructions, and then provides the paper letter to a postal service for delivery of the paper letter to the addressee. To send such an email/paper mail message, the on-line service user addresses an email message as follows: John Smith@usmail. The "@usmail" identifier informs the service provider that the user wishes to send a paper letter to, in this example, John Smith. It also initiates a process of prompting the on-line service user to (1) accept postal charges, (2) provide a return address (i.e., address for sender) and (3) provide a traditional postal address for the recipient (e.g., John Smith).

A significant disadvantage in this on-line service providers' email/paper mail service is the requirement that users repeatedly provide a return address and address for the recipient. Another disadvantage is that only users of that on-line service provider may use the email/paper mail service, despite the global nature of email permitted by the Internet.

SUMMARY OF THE INVENTION

Accordingly, the present invention is directed to an apparatus and methods for receiving email messages and generating postal mail for the received email messages that substantially obviate one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve these and other advantages and in accordance with the purpose of the invention, as embodied and broadly described, the invention provides for a method of generating mail objects from email messages. The method is performed by a computer system having at least one database containing identifiers for senders of email messages, identifiers for corresponding recipients of mail objects, and address information for both the senders and recipients. The method is broadly comprised steps of three steps: (1) receiving an email message from a sender; (2) locating in the database an identifier for the sender and an identifier for a recipient specified in the email message; and (3) generating a mail object from the email message using the address information in the database for the sender and for the recipient.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a presently preferred implementation of the invention and, together with the description, serve to explain the principles of the invention. In the drawings:

FIG. 1 is a block diagram of an email message-to-postal mail generating system according to a preferred implementation of the invention;

FIG. 2 is a block diagram of the software components for showing the operation of the email message-to-postal mail generating system according to a preferred implementation of the invention;

FIG. 14 illustrates the recipient database of the email message-to-postal mail generating system according to a preferred implementation of the invention.

DESCRIPTION OF THE PREFERRED IMPLEMENTATION

Figure 3:
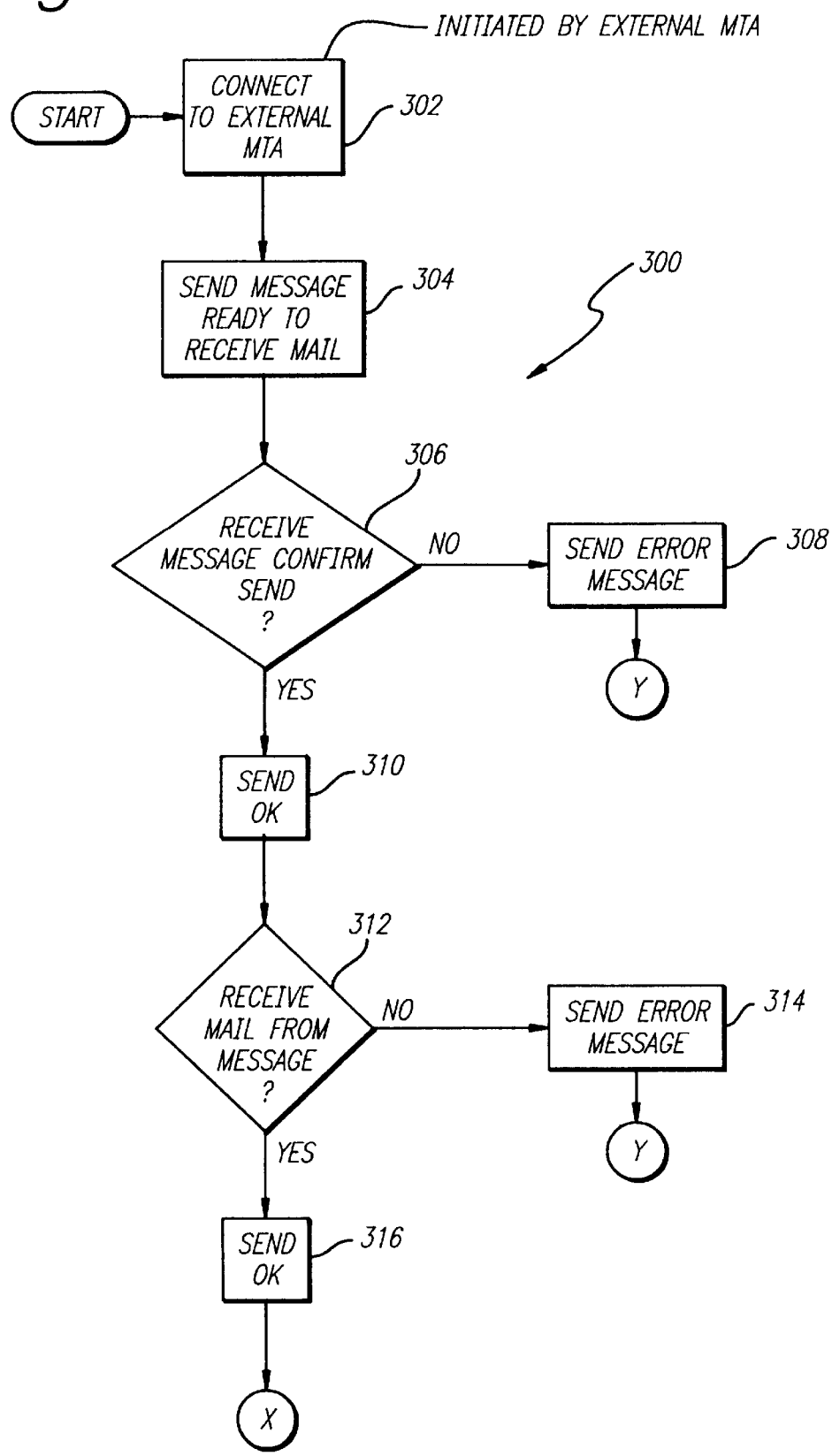
FIGS. 3 and 4 are a flow diagram of the message transfer handler software component according to a preferred implementation of the invention.

Reference will now be made in detail to the preferred implementation of the present invention as illustrated in the accompanying drawings. Whereever possible, the same reference numbers will be used throughout the drawings and the following description to refer to the same or like parts.

A. System Architecture

FIG. 1 is a block diagram of an email message-to-postal mail generating system (Netgram system) 10. The Netgram system 10 is designed to receive email messages (from the Internet) and generate postal mail (also referred to as "netgrams") from the email messages. The email messages may be sent by any computer user with access to the Internet by simply sending email messages to the Netgram system 10 using a specific domain name (e.g., "netgram.com").

Email messages may include text, graphics, and attachments (including text alone, graphics alone, or combinations of text and graphics) formatted for specific applications, for example, Microsoft Word, WordPerfect, Abode Postscript, or Envoy by Novell. The netgrams include paper letters and envelopes.

The Netgram system 10 permits users to send email messages as postal mail addressed to an intended recipient who may not have access to the Internet by identifying the recipient using an identifier or nickname. Once users send email messages addressed to intended recipients using the selected nicknames, the Netgram system 10 maintains databases including the nicknames and corresponding postal address information for each recipient based on the identity of the sender. Thus, the Netgram system 10 may receive multiple email messages addressed to, for example, "mom@netgram.com" from different senders and determine who is to receive each postal mail by referring to the databases.

As shown in FIG. 1, the Netgram system 10 comprises router 12, message transfer agent server 14, netgram workstation 16, and print server 18, all connected to network bus 11, and printer 20. The router 12 is connectable to communication lines (e.g., telephone lines) that connect the system 10 to the Internet to send and receive email messages. The router 12 is used to transfer data (e.g., email messages) between the system 10 (which is considered a network) and the Internet. Data in the system 10 is transferred among the message transfer agent server 14, netgram workstation 16, and print server 18 using a first desired data transfer protocol (e.g., Ethernet packets), while data external to the system 10 (i.e., between the system 10 and an Internet service provider) is communicated using another desired protocol (e.g., frame relay packets). The router 12 is used to translate from the first protocol to the second protocol.

In the preferred implementation, the system 10 connects indirectly to the Internet via router 12 to an Internet service provider company that provides connections to the Internet. In alternative implementations, the system 10 includes the capability to connect directly to the Internet, thereby eliminating the need for an Internet service provider company.

The message transfer agent server 14 is a computer system, such as an Intel 486-based personal computer, for executing server software applications, including a message transfer handler and transmit queue processor (described below). The server 14 includes a central processing unit (CPU) and a storage device. The storage device stores the server software applications executable by the CPU. The storage device also stores data used by the executing server software applications.

The netgram workstation 16 is a computer workstation, such as a Sparcstation by Sun Computer Corporation, comprised of a display device, one or more input devices (e.g., keyboard, mouse, etc.), and a base unit. The base unit includes a central processing unit (CPU) and a storage device. The netgram workstation 16 is also used to execute software applications, namely, a message validator and transaction queue processor (described below), stored on the storage device. The storage device also stores data used by the executing software applications including a sender database and a recipient database (described below).

The print server 18 is a computer system, such as an Intel 486-based personal computer, for executing server software applications, including a print queue processor (described below). The server 18 includes a central processing unit (CPU) and a storage device. The storage device stores the server software applications executable by the CPU. The storage devices also stores data used by the executing server software applications.

In the preferred implementation, the printer 20 is a high speed laser printer, for example, the model 4219 manufactured by Xerox Corporation. The printer 20 is connected to the print server 18 for printing postal mail generated from email messages.

The composition and protocol of the network bus 11 is not important as long as it allows for communication of data between router 12, messages transfer agent server 14, netgram workstation 16, and print server 18. In addition, the specific system architecture is not crucial to this invention. For example, another system architecture that could be used in accordance with this invention would employ a single server in place of messages transfer agent server 14, netgram workstation 16, and print server 18. It is believed, however, that the system 10 shown in FIG. 1 enhances the advantages of the present invention.

B. System Operation

FIG. 2 illustrates the software components referred to above, namely, message transfer handler, transmit queue processor, message validator, transaction queue processor, and print queue processor, all of which enable operation of the system 10. As shown, email messages are received by the system 10 by the message transfer handler 20 executing in the message transfer agent server 14. Email messages are then received by the message validator 22 executing in the netgram workstation 16. The message validator 22 determines whether each email message contains sufficient information to generate a mail object. A mail object is a data record in the system 10 that includes the contents of the email message. If the email message contains sufficient information to generate a mail object, message validator 22 provides the generated mail object to the print queue processor 24 executing in the print server 18. The print queue processor 24 then prints the mail object as a postal mail (or netgram) on the printer 20.

If the message validator 22 determines that an email message does not contain sufficient information to generate a mail object, the message validator 22 generates a partial mail object (including the contents of the email message) and provides the partial mail object to the transaction queue processor 26 executing in the netgram workstation 16. The message validator 22 also generates a return email message (also referred to as a netgram message), including exception messages (discussed below), addressed to the sender of the email message corresponding to the partial mail object. This return email message is provided to the transmit queue processor executing in the message transfer agent server 14, which then transmits the return email message (via the router 12 and the Internet) to the sender of the email message corresponding to the partial mail object.

C. Message Transfer Handler

Figure 4:
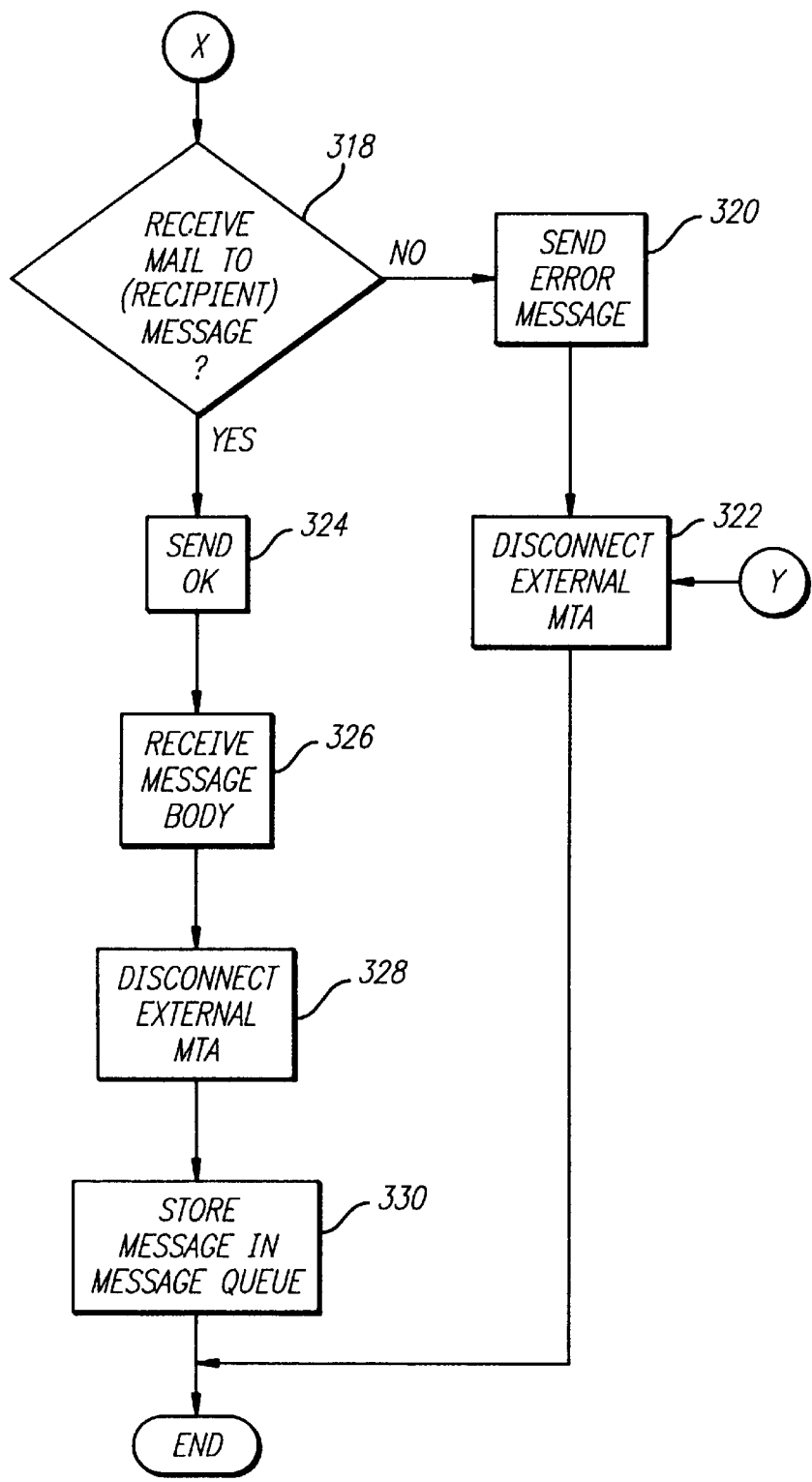
Figure 5:
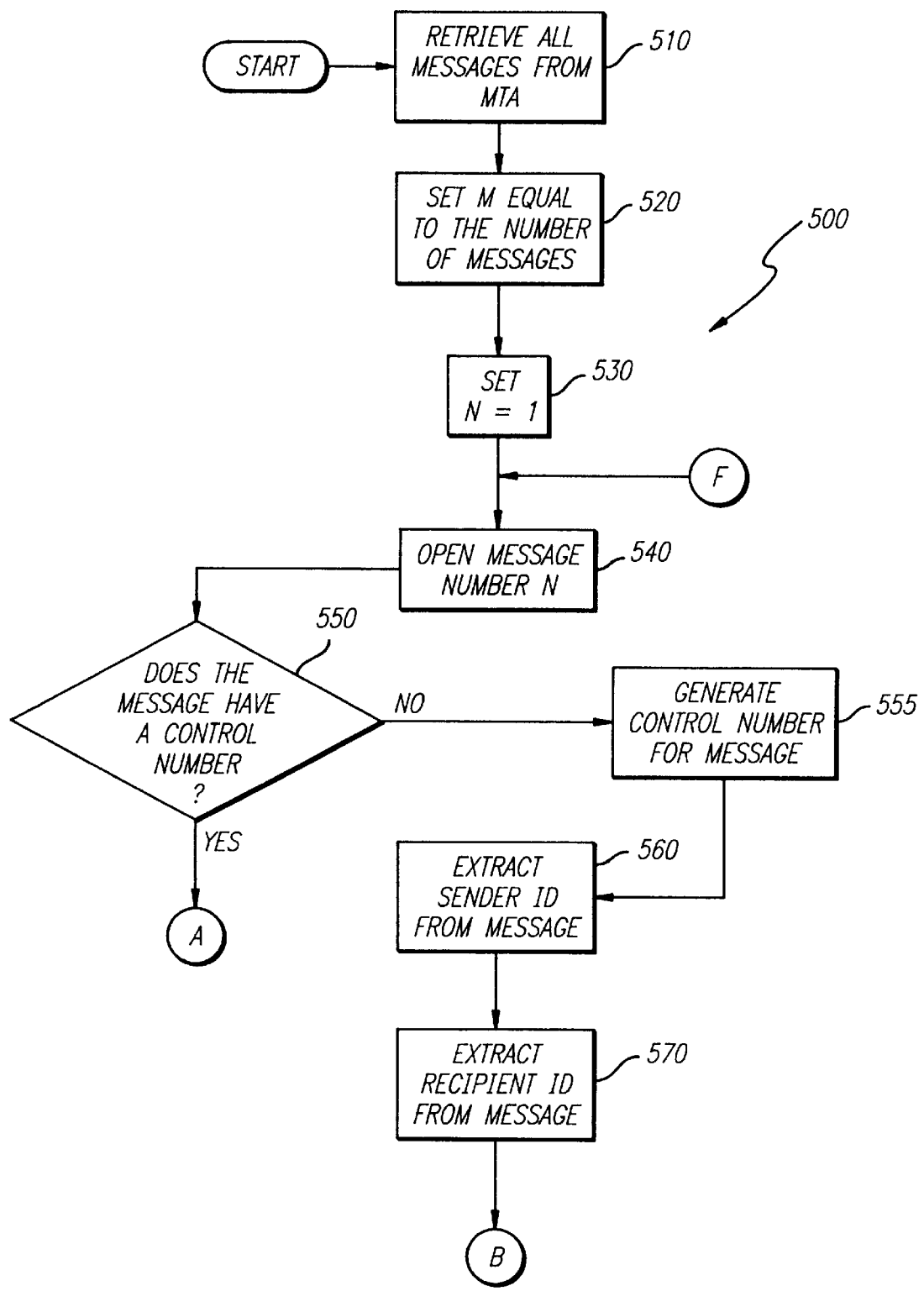
FIGS. 5–9 are a flow diagram of the message validator software component according to a preferred implementation of the invention.

A flow diagram of the steps performed by the message transfer handler 20 according to the preferred implementation of the present invention is illustrated in FIGS. 3 and 4. The message transfer handler 20 is a software component including procedure 300 executable by the message transfer agent server 14 in the preferred implementation. By software component it is meant that the message transfer handler 20 comprises a set of computer program instructions that dictate a set of functions and operations to be performed by the message transfer agent server 14. The message transfer handler 20 uses the SMTP protocol, which is discussed in "TCP/IP Illustrated, Vol. 1," by W. Richard Stevens (Addison Wesley, 1994).

In the first step 302, the message transfer handler 20 accepts connection for the system 10 to a message transfer agent associated with a sender who sent an email message to the system 10 (i.e., "sender's mail host") with an Internet service provider for the system 10 providing connectivity or a means for connecting the sender's mail host with the system 10. This connection is established using communication lines of router 12.

As explained, in other configurations, the services of an Internet service provider may be eliminated by including those services among the functions performed by the message transfer handler 20.

The message transfer handler 20 sends a message to the sender's mail host indicating that the handler 20 is ready to receive email messages (step 304). The message transfer handler 20 then receives a message from the sender's mail host, which confirms that the sender's mail host is ready to send to the system 10 (and specifically the message transfer agent server 14) email messages (step 306). If the confirmation message is not received within a predetermined period of time (as indicated by decision box 306 in FIG. 3), then the message transfer handler 20 sends to the sender's mail host an error message (step 308). At this point, processing of the message transfer handler 20 continues with step 322 of FIG. 4.

As shown in FIG. 4, when the message transfer handler 20 sends to the sender's mail host an error message (steps 308, 314, and 320), the message transfer handler 20 disconnects the system 10 from the sender's mail host (step 322), and completes execution.

If, however, the message transfer handler 20 receives the confirmation message from the sender's mail host (step 306 in FIG. 3), then the message transfer handler 20 sends an OK message to the sender's mail host (step 310). The message transfer handler 20 now waits to receive a "MAIL FROM" message that identifies the source (sender) of an email message from the sender's mail host (step 312). If a MAIL FROM message is not received within a predetermined period of time (as indicated by decision box 312 in FIG. 3), then the message transfer handler 20 sends to the sender's mail host an error message (step 314). At this point, processing of the message transfer handler 20 continues with step 322 of FIG. 4, and the message transfer handler 20 disconnects the system 10 from the sender's mail host.

The MAIL FROM message would identify, using an appropriate Internet address, for example, "jeff@finnegan.com", the sender of an email message to the system 10. This example MAIL FROM message specifies that an email message is from a user identified by "jeff" on a system identified by "finnegan.com".

If the message transfer handler 20 receives a MAIL FROM message (step 312), the message transfer handler 20 sends an OK message to the sender's mail host (step 316). The message transfer handler 20 now waits to receive a "RCPT" message, i.e., "MAIL TO" message, that identifies the recipient (addressee) of an email message from the sender's mail host (step 318). If a MAIL TO message is not received within a predetermined period of time (as indicated by decision box 318 in FIG. 4), then the message transfer handler 20 sends to the sender's mail host an error message (step 320). At this point, processing of the message transfer handler 20 continues with step 322 of FIG. 4, and the message transfer handler 20 disconnects the system 10 from the sender's mail host.

A portion of the MAIL TO message identifies to the sender's mail host that a specific email message is intended to be received by the system 10. Specifically, if an email address (MAIL TO) is addressed to, for example, "netgram.com", then the sender's mail host determines that the email message containing that email address is intended for the system 10. Other such mail addresses may also be used to instruct the sender's mail host that an email message is intended for the system 10.

It is a function of the message transfer handler for different types of computer systems to determine whether a user identified in an email message (MAIL TO) is identified as a user of the system associated with that message transfer handler. For example, if the MAIL TO message is "jeff@finnegan.com", the message transfer handler determines whether a user identified by "jeff" is a user of the finnegan.com system and can thus receive messages by connection to the system 10. The message transfer handler 20, however, does not make such a determination. The message transfer handler 20 accepts all email messages addressed to its domain address, for example, "netgram.com", without regard for the identity of the user specified in the MAIL TO message.

When the message transfer handler 20 receives a MAIL TO message (step 318), the message transfer handler 20 sends an OK message to the sender's mail host (step 324). The message transfer handler 20 waits for and receives the body of the email message from the sender's mail host (step 326). At this point, the message transfer handler 20 disconnects the system 10 from the sender's mail host (step 328).

After disconnecting from the sender's mail host (step 328), the message transfer handler 20 puts the received email message, including the MAIL FROM, MAIL TO, and body of the email message, on an email message queue (step 330).

The procedure 300 of the message transfer handler 20 is used repeatedly (for example, at predetermined timed intervals) to receive email messages from the sender's mail host. In this fashion, the message transfer agent server 14 of the system 10 receives email messages addressed to the system 10.

D. Message Validator

At the heart of the present invention is the message validator 22. A flow diagram of the steps performed by the message validator 22 according to the preferred implementation of the present invention is illustrated in FIGS. 5–9.

Like the message transfer handler 20, the message validator 22 is a software component. The message validator 22 includes procedure 500 (illustrated in FIGS. 5–9) executable by the netgram workstation 16 in the preferred implementation. By software component it is meant that the message validator 22 comprises a set of computer program instructions that dictate a set of functions and operations to be performed by the netgram workstation 16.

The message validator 22 first retrieves at a predetermined time interval all email messages in the system 10 from the external message transfer agent server 14, which email messages have been previously received and queued on the email message queue by the message transfer handler 20 (step 510). The message validator 22 sets M (a variable) equal to a numeric value for the total number of email messages retrieved from the queue in step 510 (step 520). The message validator 22 sets N (another variable) equal to the numeric value 1 (step 530). The message validator 22 uses M and N to process all M email messages, one after the other, starting at message N (or the first message).

Figure 10:
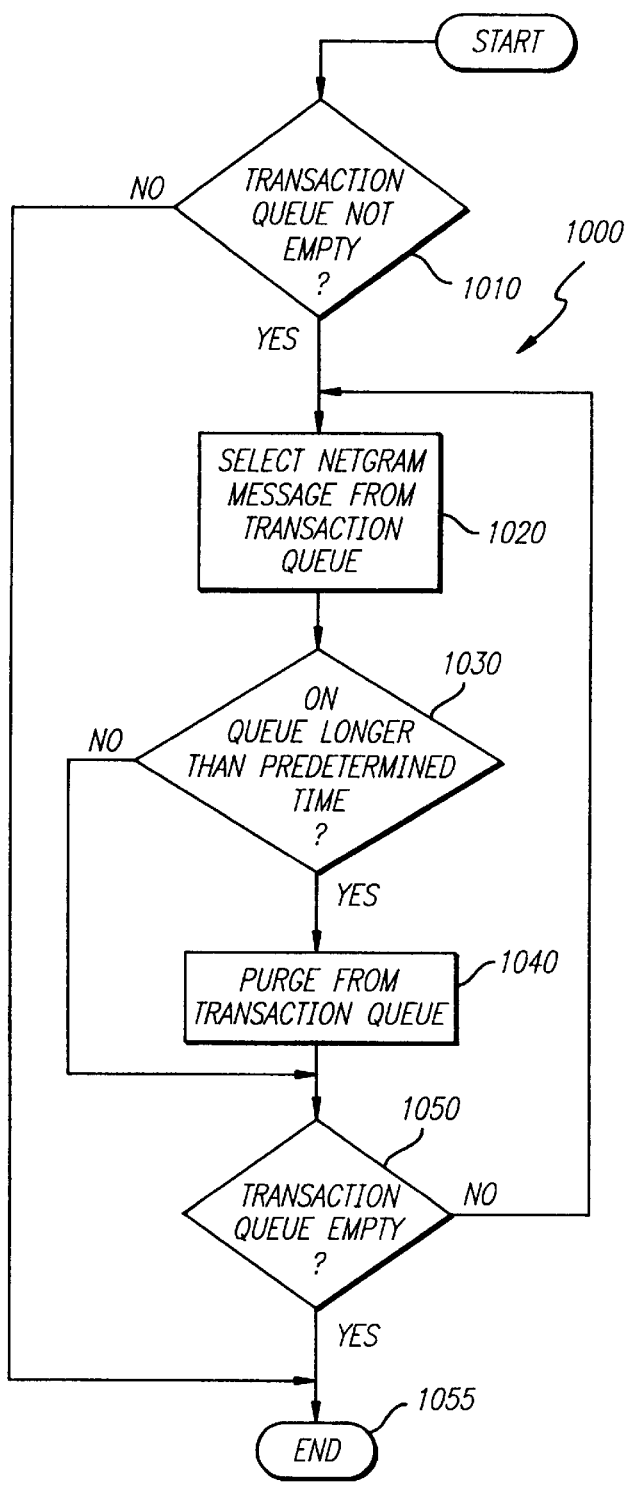
FIG. 10 is a flow diagram of the transaction queue processor software component according to a preferred implementation of the invention.

In step 540, the message validator 22 opens the first email message (N=1) of the email messages retrieved from the queue, and then determines whether the opened email message is a continuation email message of an email message previously received by the system 10 by determining whether the message has a control number (step 550). It is possible that the message validator 22 receives an email message that cannot be processed (i.e., transformed into a postal mail) because, for example, the sender is not a recognizable user of the system 10 or the sender has not provided advance compensation for use of the system 10. Under these and other similar conditions, the message validator 22 will queue an email message to a transaction queue and initiate the process of informing the sender that the email message cannot be processed by the system 10. As described more fully below, partially completed email messages are queued to a transaction queue where they can be retrieved later (using a unique control number). Transaction queue processing will be described with reference to FIG. 10.

If the opened email message is not a continuation email message (step 550), then the message validator 22 generates a new, unique control number for the email message (step 555). The message validator 22 extracts from the email message the identifier of the source (sender) of the email message (step 560) and the identifier of the recipient (addressee) of the email message (step 570). In other words, the addressee identifies a person to whom the sender wishes to send a postal mail (e.g., a letter corresponding to the email message).

Figure 6:
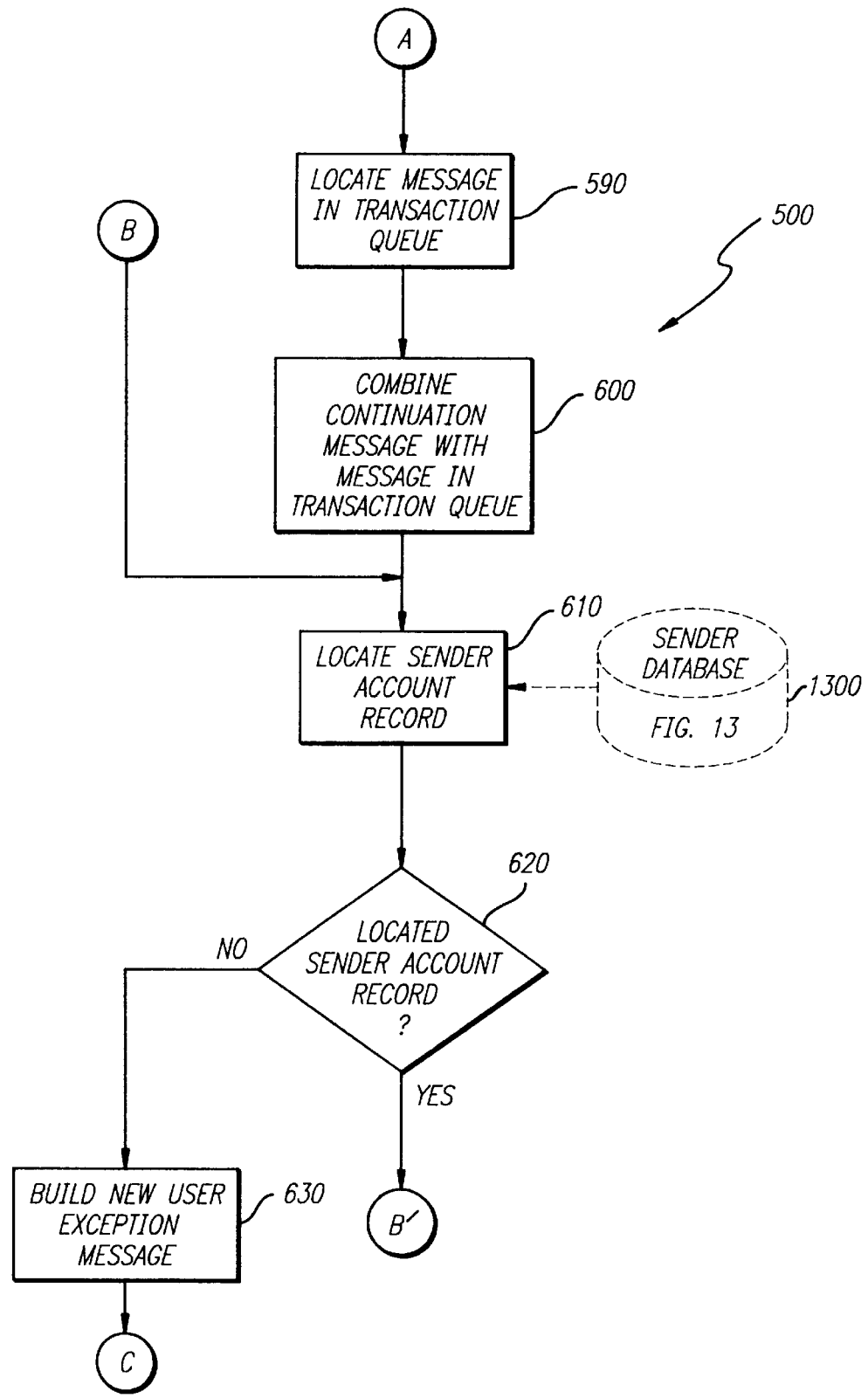
Figure 7:
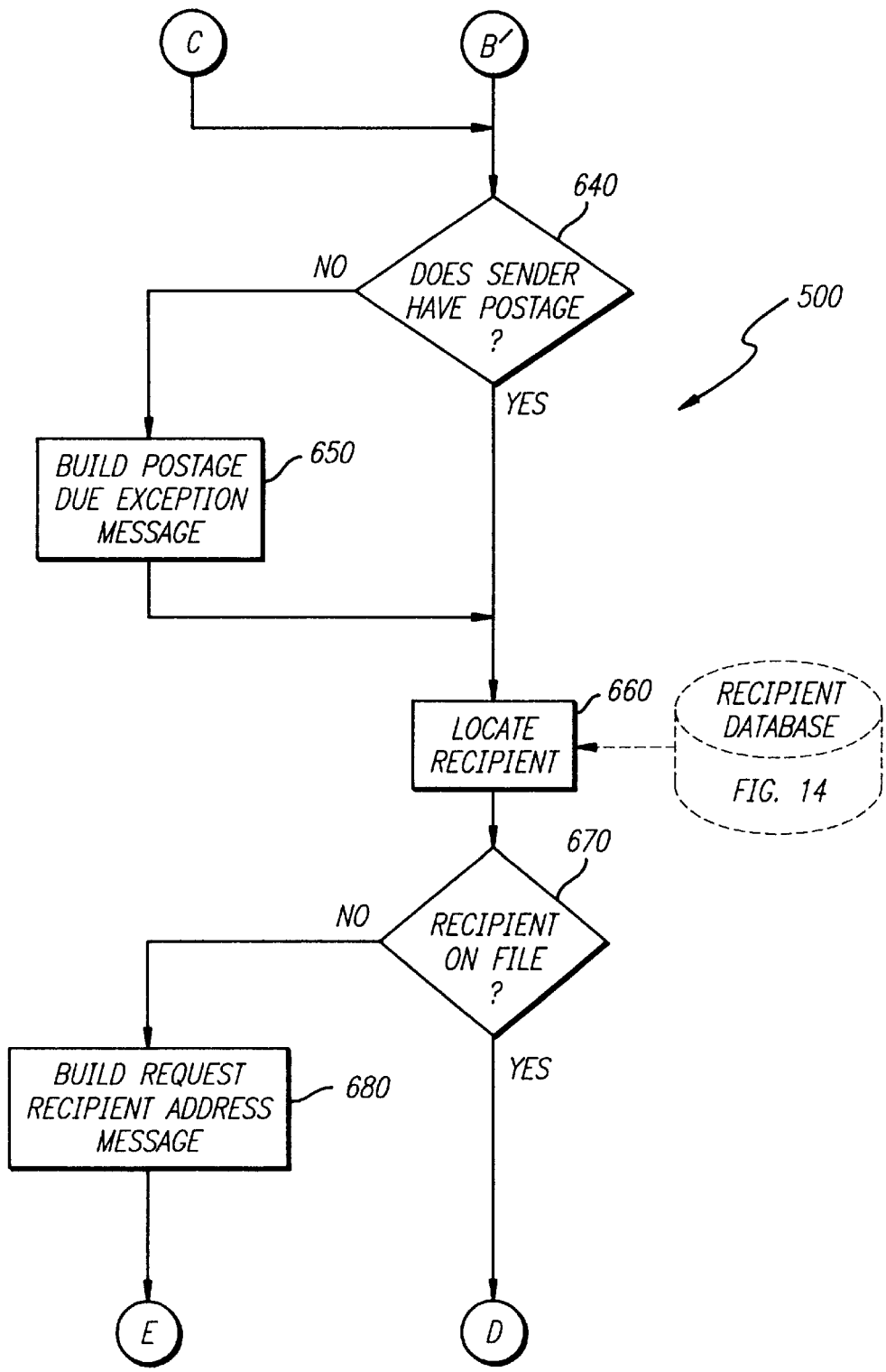

Otherwise, if the opened email message is a continuation email message, then the message validator 22 locates in the transaction queue the email message that corresponds to the now opened continuation email message (step 590 in FIG. 6). For example, a sender may send an email message to the system 10, but the sender is not a registered user of the system 10 (and thus cannot send postal mail through the system 10). In this case, the system 10, will queue the sender's email message in a transaction queue and return an email message to the sender requesting the necessary information to register the sender. The email message sent to the sender will contain a unique control number, which will be used to identify the sender's original email message in the transaction queue when the sender responds to the email message requesting registration information.

After locating in the transaction queue the original email message that corresponds to a continuation email message (step 590), the message validator 22 combines the original email message (from the transaction queue) with its continuation email message (step 600 in FIG. 6). In this way both new email messages (i.e., ones that are not continuations of previously received email messages) and email messages that have been queued in the transaction queue will be processed by the message validator 22 in the same manner.

The message validator 22 will then access the sender database 1300 (See FIG. 13) to locate an account record for the sender in that database (step 610). If a sender account record is located in the sender database 1300 (step 620) then the message validator 22 continues by reviewing the information in the sender's account record (step 640 in FIG. 7). Otherwise, if a sender account record is not located in the sender database 1300 (step 620) then the message validator 22 builds a new user exception message (step 630), which the system 10 will later send as a part of an email message to the sender. This new user exception message is used to request from the sender information required to add an account record in the sender database 1300 for the sender.

In reviewing the information in a sender's account record (step 640 in FIG. 7) or after determining that a sender account record is not located in the sender database 1300 (step 620), the message validator 22 determines whether the sender's account contains sufficient credit for postage (step 640) to complete the process of generating a mail object, printing the postal mail, and providing the postal mail to, for example, the U.S. Postal Service for delivery to an identified recipient (addressee). As explained below with reference to FIG. 13, the sender account records in the sender database 1300 specify whether a sender has paid for or established an account to pay for required postage.

If a sender account record does not indicate that a sender has postage (step 640), the message validator 22 builds a postage due exception message (step 650), which the system 10 will later send as a part of an email message to the sender. This new user exception message is used to request from the sender information required to add to an account record in the sender database 1300 for the sender. In the preferred implementation, postage is prepaid by senders. However, senders may also choose to provide necessary credit card information for postage. But email messages being transmitted over the Internet are not now considered private. Thus, it is proposed that encryption techniques such as Pretty Good Privacy, using public keys and private keys, may be used to encrypt email messages received and sent by the system 10. Using such encryption techniques, security for credit card numbers received by the system 10 is increased.

After it is determined that a sender has postage (step 640) or after building a postage due exception message (step 650), the message validator 22 will access the recipient database 1400 (See FIG. 14) to locate a record corresponding to the recipient identified by the email message (step 660). As explained, it is possible for many senders to send email messages to the system 10 identifying the recipient as, for example, "mom." The recipient database 1400, however, includes the identity of all senders and corresponding recipients so that when, for example, jeff@finnegan.com (sender) sends an email message to the system 10 (which email message is intended to print a postal mail) using a recipient address such as "mom@netgram.com", the system 10 determines the postal mailing address for a recipient named "mom" for the sender jeff@finnegan.com.

Figure 8:
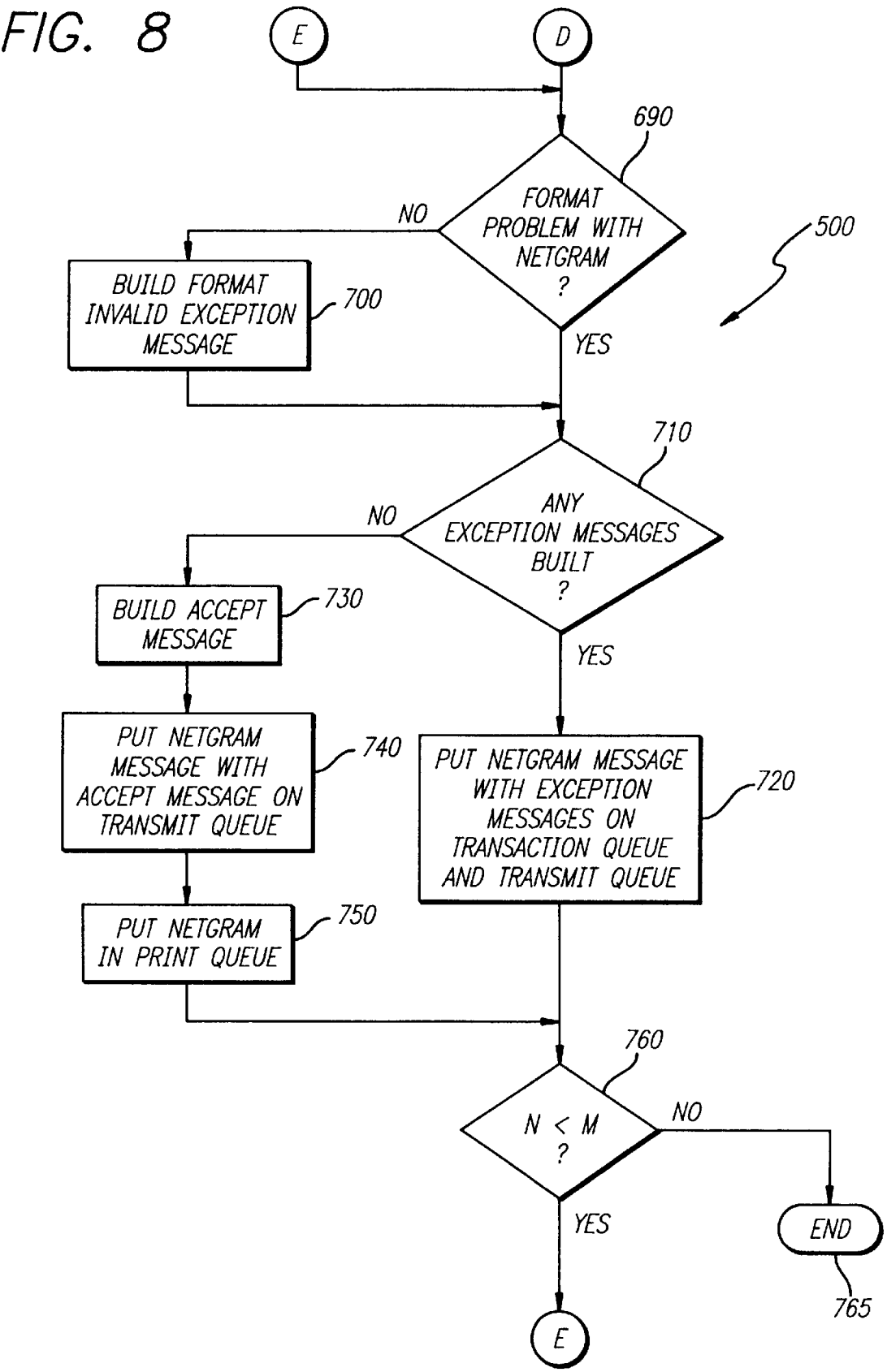
Figure 9:
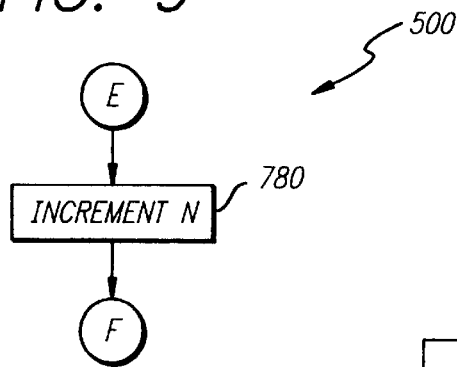

If a record for the specified recipient (corresponding to the sender of an email message) is located in the recipient database 1400 (step 670) then the message validator 22 continues by reviewing the email message for format (step 690 in FIG. 8). Otherwise, if a record for the specified recipient is not located in the recipient database 1400 (step 670) then the message validator 22 builds a recipient address exception message (step 680), which the system 10 will later send as a part of an email message to the sender.

In reviewing the email message for format (step 690 in FIG. 8) or after building a recipient address exception message (step 680), the message validator 22 determines whether a postal mail (e.g., a letter and envelope) can be constructed using the information in the email message and from the databases 1300 and 1400 (step 690). If format problems exist (step 690), then the message validator 22 builds a format exception message (step 700), which the system 10 will later send as a part of an email message to the sender.

Figure 11:
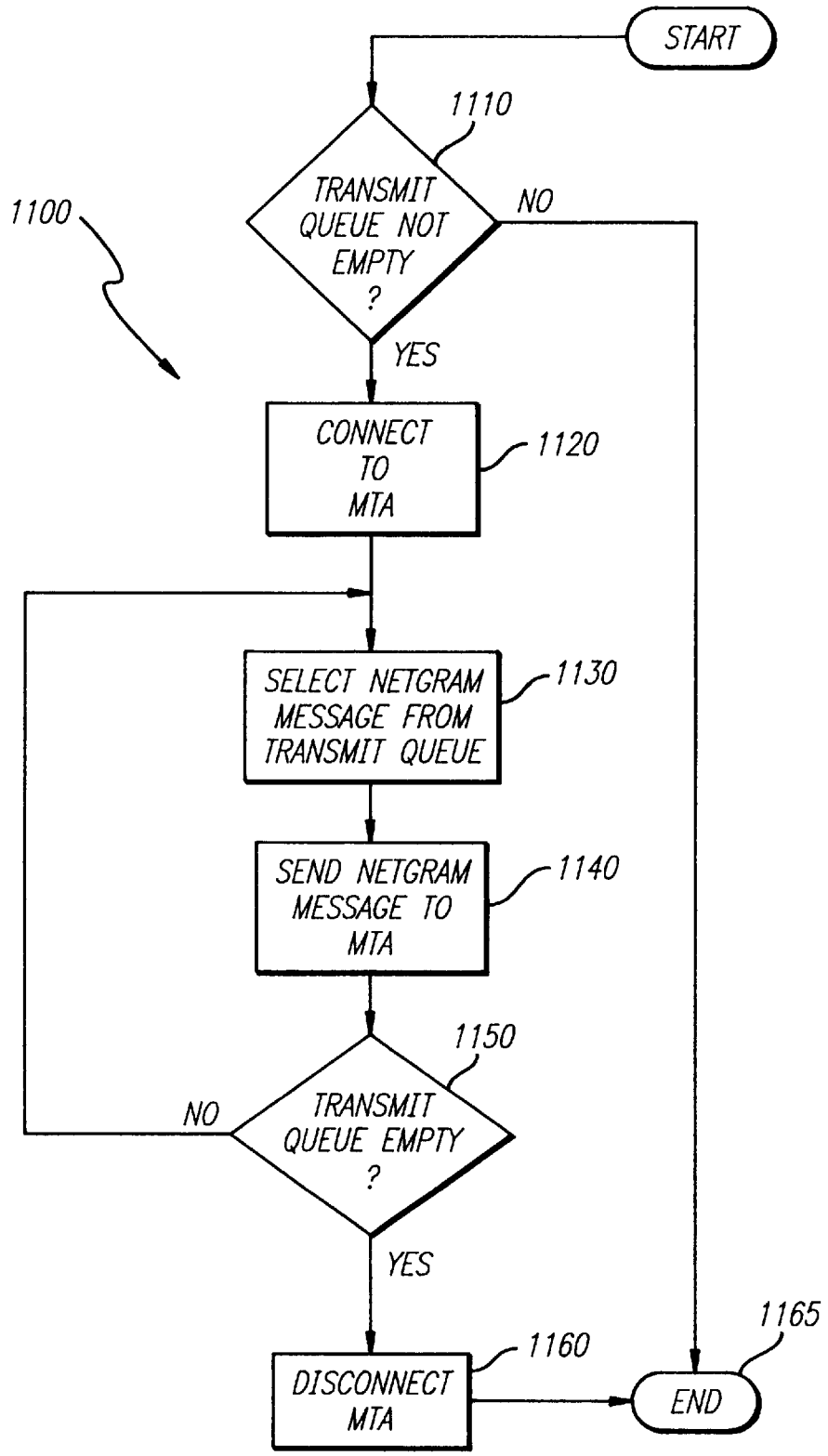
FIG. 11 is a flow diagram of the transmit queue processor software component according to a preferred implementation of the invention.

After building a format exception message (step 700) or if there are no format problems (step 690), the message validator 22 determines whether any exception messages have been built (step 710). As explained, exception messages may comprise: new user exception message (step 630), postage due exception message (step 650), a recipient address exception message (step 680), and format exception message (step 700). If exception messages have been built (step 710), then the message validator 22 constructs a return email (or netgram) message, including any exception messages, and queues the originally received email message with the unique control number as a partial mail object in the transaction queue (which will be used when a continuation email message is received from the sender at a later time) and queues the netgram message in a transmit queue (which the system 10 will use to transmit to the sender to inform the sender of the exceptions found in the sender's email message). Transmit queue processing will be described below with reference to FIG. 11.

If, however, no exception messages have been built (step 710), then the message validator 22 builds an accept message (step 740), and queues in the transmit queue a return email (or netgram) message, including the accept message. The system 10 will use the return email message having an accept message to transmit to the sender to inform the sender that the sender's email message has been accepted and that the system 10 will process the sender's email message (i.e., construct a postal mail).

After completing the function of step 740, the message validator 22 constructs a mail object from the email message as well as information from the sender database 1300 and the recipient database 1400 and queues the mail object in a print queue (step 750). Print queue processing will be described below with reference to FIG. 12.

The message validator 22 then determines whether all of the email messages retrieved from the message transfer agent server 14 (step 510) have been processed (step 760). This determination is made by comparing N (the number of the email message currently being processed by the message validator 22) with M (the total number of retrieved email messages). If N is less than M (i.e., there are more retrieved email messages to be processed), then the message validator 22 increments N (step 780 in FIG. 9) and continues to process the next email message at setup 540 of FIG. 5. In this manner all retrieved email messages are processed one at a time by the message validator 22. If N is equal to M, then the processing of the message validator 22 ends (step 765).

E. Transaction Queue Processor

The transaction queue processor 16 processes partial mail objects on the transaction queue. As explained above, the message validator 22 builds exception messages, including a new user exception message (step 630), a postage due exception message (step 650), a recipient address exception message (step 680), and a format exception message (step 700). If exception messages have been built (step 710), then the message validator 22 constructs a return email message, including any exception messages, and queues the originally received email message as a partial (or not yet completed) mail object to the transaction queue.

The transaction queue processor 26 is a software component including procedure 1000 (illustrated in FIG. 10) executable by the netgram workstation 16 in the preferred implementation. By software component it is meant that the transaction queue processor 26 comprises a set of computer program instructions that dictate a set of functions and operations to be performed by the netgram workstation 16.

At predetermined time intervals, the transaction queue processor 26 determines whether the transaction queue is not empty (step 1010). If the transaction queue is empty (step 1010) then processing by the transaction queue processor 26 ends (step 1055). If the transaction queue is not empty (step 1010), then the transaction queue processor 26 selects a partial mail object from the transaction queue (step 1020) and determines whether the partial mail object has been on the transaction queue for longer than a predetermined period of time (step 1030). If the partial mail object has been on the transaction queue for longer than a predetermined period of time (step 1030), then the transaction queue processor 26 purges the partial mail object from the transaction queue (step 1040).

If the partial mail object has not been on the transaction queue for longer than a predetermined period of time (step 1030) or after purging the partial mail object from the transaction queue (step 1040), the transaction queue processor 26 determines whether the transaction queue is empty (step 1050). If the transaction queue is empty (step 1050), then the transaction queue processor 26 completes processing (step 1055). If, however, the transaction queue is not empty (step 1050), then the transaction queue processor 26 selects another partial mail object from the transaction queue and continues to process that selected partial mail object in a similar manner (steps 1020–1040).

In this manner, the transaction queue processor 26 makes sure that partial mail objects do not become stale, that is, have not been waiting on the transaction queue to be complete for too long a period of time (i.e., greater than a predetermined period of time). If a partial mail object is purged from the transaction queue, this means that a sender failed to timely respond to an email message from the system 10 that contained exception messages.

F. Transmit Queue Processor

As explained above, the transmit queue manages return email (netgram) messages to be sent by the system 10 to a sender who previously sent an email message to the system for processing into a mail object. The message validator 22 builds exception messages, including a new user exception message (step 630, FIG. 6), a postage due exception message (step 650, FIG. 7), a recipient address exception message (step 680, FIG. 8), and a format exception message (step 700). If exception messages have been built (step 710), then the message validator 22 constructs a return email (or netgram) message, including any exception messages, and queues the email message to both the transaction queue and the transmit queue. The message validator 22 also builds an accept message (step 740), and queues on the transmit queue a return email (or netgram) message, including the accept message, when it is appropriate to inform the sender that the sender's email message has been accepted and that the system 10 will process the sender's email message.

Like the transaction queue processor 26, the transmit queue processor 28 is a software component including procedure 1100 (illustrated in FIG. 11) executable by the message transfer agent server 14 in the preferred implementation. By software component it is meant that the transmit queue processor 28 comprises a set of computer program instructions that dictate a set of functions and operations to be performed by the message transfer agent server 14.

At predetermined time intervals, the transmit queue processor 28 determines whether the transmit queue is not empty (step 1110). If the transaction queue is empty (step 1110) then processing by the transmit queue processor 28 ends (step 1065).

If, however, the transaction queue is not empty (step 1110), then the transmit queue processor 28 connects the system 10 to an Internet service provider, which provides message transfer agent functions for the system 10 to send email messages to Internet users (step 1120). The transmit queue processor 28 selects a netgram message from the transmit queue (step 1130), and sends the netgram message to the connected Internet service provider (step 1140). Netgram messages sent to the Internet service provider are taken off of the transmit queue.

After sending a netgram message to the Internet service provider, the transmit queue processor determines whether the transmit queue is empty (step 1150). If the transmit queue is empty (step 1150), then the system 10 is disconnected from the Internet service provider (step 1160) and processing ends (step 1165). Otherwise, when the transmit queue is not empty (step 1150), the transmit queue processor 28 returns to perform the functions of steps 1130–1150, selecting another netgram message from the transmit queue (step 1130), sending the selected netgram message (step 1140), and determining again whether the transmit queue is empty (step 1150).

In this manner, the transmit queue processor 28 sends email messages to those who previously sent email messages to the system 10 email, including ones with exception messages or an accept message.

G. Print Queue Processor

As explained, the message validator 22 constructs mail objects from email messages, which mail objects use information from the sender database 1300 and the recipient database 1400, and queues the mail objects in a print queue (step 750). The print queue processor 24 processes the mail objects in the print queue.

The print queue processor 24 is also a software component, including procedure 1200 (illustrated in FIG. 12) executable by the print server 18 in the preferred implementation. By software component it is meant that the print queue processor 24 comprises a set of computer program instructions that dictate a set of functions and operations to be performed by the print server 14.

At predetermined time intervals, the print queue processor 24 determines whether the print queue is not empty (step 1110). If the print queue is empty (step 1210), then processing by the print queue processor 24 ends (step 1245).

If, however, the print queue is not empty (step 1210), then the print queue processor 24 selects a mail object from the print queue (step 1220), and prints the mail object as a postal mail (or netgram) on printer 20 (step 1230). Netgrams include a letter and corresponding envelope. Printed on each letter is the text from an email message received by the system 10. The printer 20 prints on an envelope the return address (i.e., a street address for the sender) and the address (i.e., street address) of the intended recipient of the netgram, including necessary information for the U.S. postal service to deliver the netgram. Mail objects selected from the print queue and printed by the printer 20 are taken out of the print queue.

After printing a netgram, the print queue processor 24 determines whether the print queue is empty (step 1240). If the print queue is empty (step 1240), then processing by the print queue processor 24 ends (step 1245). Otherwise, when the print queue is not empty (step 1240), the print queue processor 24 returns to perform the functions of steps 1220–1240, selecting another mail object from the print queue (step 1220), printing a netgram from the selected mail object (step 1230), and determining again whether the print queue is empty (step 1240).

H. Sender Database

Figures 12, 13:
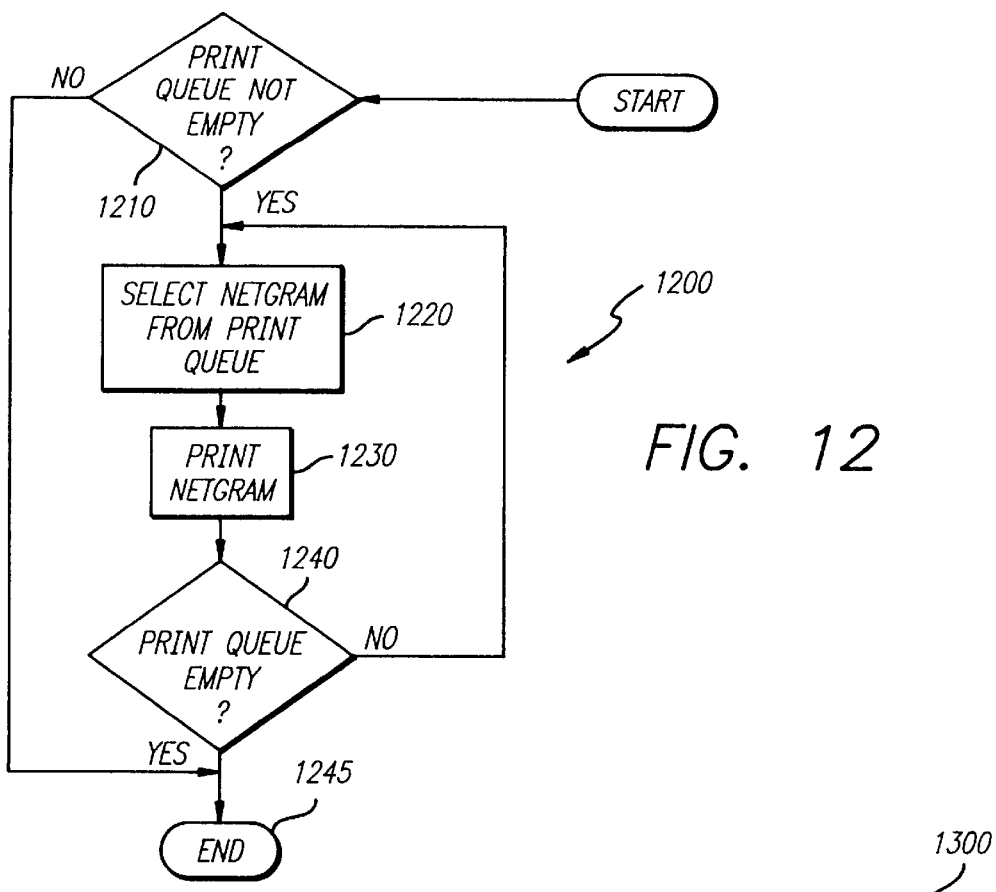
FIG. 12 is a flow diagram of the print queue processor software component according to a preferred implementation of the invention.
FIG. 13 illustrates the sender database of the email message-to-postal mail generating system according to a preferred implementation of the invention.

The message validator 22 accesses the sender database 1300 to determine whether senders have previously registered to send netgrams using the system 10 and whether sender accounts have sufficient postage to compensate the operator of the system 10 for providing the service of processing email messages into mail objects and posting the printed netgrams to intended recipients. The sender database 1300 is shown in FIG. 13.

The sender database 1300 primarily consists of a table containing identifiers for senders 1310 and information on whether each sender has postage (credit) 1320 to permit sending netgrams. The table entries 1330 illustrate the types of entries included in the sender database 1300. For example, a sender identified by "jeff@finnegan.com" has 4 credits. In other words, the sender identified by "jeff@finnegan.com" has prepaid for 4 netgrams and, therefore, can send 4 netgrams without prepaying to send additional netgrams. Each time the message validator 22 puts a mail object (netgram) on the print queue, it decrements the number of credits (postage) for the sender corresponding to the mail object placed in the print queue.

I. Recipient Database

The message validator 22 also accesses the recipient database 1400 to determine whether recipients identified in email messages by senders have been previously registered with the system 10 as recipients of particular sender's netgrams. The recipient database 1400 is shown in FIG. 14.

The recipient database 1400 primarily consists of a table comprising identifiers for senders 1410 (similar the sender database 1300), post office (street) addresses for senders 1420, recipient nickname identifiers 1430, post office (street) addresses for recipients 1440, as well as the full name of recipients 1450. The recipient database 1400 illustrated in FIG. 14 includes a number of example entries 1460. The recipient database 1400 may also include additional information provided by senders concerning their corresponding recipients. For example, senders may provide demographic information, which information may be used to include in netgrams advertising for appropriately selected companies and products (discussed further below).

The first of these example entries 1460 specifies an identifier for a sender "jeff@finnegan.com", whose address is "8141 Trovor Place, Vienna, Va. 22182". The sender identified by jeff@finnegan.com previously registered with the system 10 and specified that a recipient named "Marcia Baris", whose address is "67 Sinclair Drive, Wayne, N.J. 07470" has a nickname of "mom@netgram.com". The message validator 22 uses this information to construct a mail object (netgram) for the sender identified by jeff@finnegan.com.

Note that the second entry in the recipient database also specifies a nickname of "mom@netgram.com". However, the sender identification is different, namely, "TXS@fame.com". The message validator 22 uses sender identifiers when identifying recipients in the recipient database 1400. This way more than one sender may use the same recipient nickname identifier, i.e., "mom@netgram.com".

Another advantage of the sender database 1300 and recipient database 1400, is that they both permit senders to register with the system 10. They also permit senders to specify recipients of mail objects (netgrams) a first time the senders wish to send netgrams to specific recipients. After a netgram is sent to a recipient a first time, the system 10 permits senders to send additional netgrams to the same recipient without having to again provide information, i.e., the full name of the recipient and the recipient's address. Such a host-based system permits users to send netgrams from different computers using different software to connect to and send email messages in the Internet because the system maintains the sender database 1300 and recipient database 1400. Neither database is maintained on a sender's computer. Senders may also access the recipient database 1400 to alter information for corresponding recipients in the database 1400.

The present invention, thus, permits a sender located in one country (e.g., Brussels) to send a letter (i.e., netgram) to an recipient in another country (e.g., United States), eliminating the need to use international postal services (i.e., the postal service of both countries) and minimizing postal charges resulting from using international postal services.

It should be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

One such modification concerns the addition of advertising information in netgrams. Advertising information may include information on the products and/or services of companies. It may also include coupons or other similar promotional offers that are used to promote products and/or services.

For example, the message validator 22 may include functions that generate appropriate advertising information in netgrams. In one case, the message validator 22 may determine that a particular sender is associated with an educational institution (i.e., a student at a specific university), and generate in the netgram sent by that student, for example, to his/her parent an advertisement for the student's university or other establishment, which is determined based upon information stored in the system 10 concerning the sender. In another case, appropriate advertisement may be selected based upon stored information concerning the recipient. If the recipient's address places the recipient within, for example, a 10 mile radius of a particular business establishment, an advertisement for that establishment may be included in the netgram.

What is claimed is:

1. A method of generating mail objects from email messages performed by a computer system at a first station with at least one database containing identifiers for senders of email messages, identifiers for corresponding recipients of mail objects, and address information for both the senders and recipients, the method comprising the steps of:

receiving at the first station from a sender an email message intended by the sender to be delivered by postal mail to a recipient;

locating in a database at the first station the identifier for the sender and the identifier for the recipient specified in the email message;

sending the email to a second station near the address of the recipient; and generating at the second station a mail object from the email message using the address information identified in the database at the first station for the sender and for the recipient.

2. The method of claim 1 wherein the second station has a computer system and such computer system includes a printer, the generating step including the substep of:

printing on the printer at the second station a postal mail from the mail object.

3. The method of claim 1, wherein the identifier for the sender includes a domain identifier that identifies a network associated with the sender.

4. The method of claim 2, wherein the database includes demographic information on recipients and the postal mail includes an advertisement, said advertisement being selected based on the demographic information for the recipient.

5. A method of generating mail objects from email messages performed by a computer system at a first station at least one database containing identifiers for senders of email messages, identifiers for corresponding recipients of mail objects, and address information for both the senders and the recipients, the method comprising steps of:

receiving at the first station an email message from a sender, including an identifier of the sender and an identifier of a recipient;

locating in the database of the computer system the identifier of the sender to determine the name and address of the sender;

locating in the database of the computer system the identifier of the recipient to determine the name and address of the recipient;

sending the email message from the computer system to a receiving station near the address of the recipient, the email message including the name and address of the sender and the name and address of recipient, and generating a mail object at the receiving station from the received email message using the name and address information in the database for the sender and for the recipient.

6. The method of claim 5 wherein the computer system includes a printer, the generating step including the substep of:

printing at the receiving station the mail object as a postal mail on a printer at the receiving station.

7. The method of claim 5, wherein the identifier for the sender includes a domain identifier that identifies a network associated with the sender.

8. The method of claim 6, wherein the postal mail includes the advertisement, said advertisement being selected based on at least one of the identifier for the sender, address information for the sender, and address information for the recipient.

9. A method of generating mail objects from email messages performed by a computer system at a first station with at least one database containing identifiers for senders of email messages, identifiers for corresponding recipients of mail objects, and name and address information for both the senders and the recipients based upon the identifiers for the senders and the recipients, the method comprising steps of:

receiving at the first station an email message from a sender, including an identifier of the sender and an identifier of a recipient;

locating in the database of the computer system the identifier of the sender to determine the name and address of the sender;

locating in the database of the computer system the identifier of the recipient to determine the name and address of the recipient;

determining in the computer system whether the identifier of the sender in the database corresponds to the identifier of the recipient in the database;

sending the email massage to a receiving station near the address of the recipient when the computer system determines that the identifier of the sender in the database corresponds to the identifier of the recipient in the database, generating at the receiving station a mail object from the received email message using the address information in the database for the sender and for the recipient.

10. The method of claim 9 wherein the computer system includes a printer, the generating step including the substep of:

printing at the receiving station the mail object as a postal mail on a printer at the receiving station; and mailing the mail object to the recipient as postal mail.

11. A method of generating mail objects from email messages performed by a computer system at a first station with at least one database containing identifiers for senders of email messages, identifiers for corresponding recipients of mail objects, and name and address information for both the senders and the recipients based upon the identifiers of the sender and the recipient, the method comprising the steps of:

receiving at the computer system from a sender an email message intended for a recipient;

extracting from the received email message an identifier of the sender and an identifier of the recipient;

locating in the database at the computer system the identifier of the sender;

determining whether the database contains the identifier of the recipient and whether the identifier of the recipient corresponds to the identifier of the sender; and generating a mail object, at the computer system from the received email message, to a receiving station near the address of the recipient by using the address information in the database for the sender and for the recipient if it is determined at the computer system that the identifier of the recipient corresponds to the identifier of the sender.

12. The method of claim 11 wherein the computer system includes a printer, the generating step including the substep of:

printing the mail object as a postal mail on a printer at the receiving station.

13. A method of generating mail objects from email messages performed by a computer system at a first station with at least one database containing identifiers for senders of email messages, identifiers for corresponding recipients of mail objects, and name and address information for both the senders and the recipients based upon the identifiers of the sender and the recipient, the method comprising steps of:

receiving at the computer system an email message intended by a sender to be mailed to a recipient;

extracting at the computer system from the received email message an identifier of the sender and an identifier of the recipient;

locating in the database at the computer system the identifier of the sender;

determining in the database at the computer system whether the database contains the identifier of the recipient and whether the identifier of the recipient corresponds to the identifier of the sender; and transmitting the email message from the computer system to a receiving station near the address of the recipient when it is determined at the computer system that the database in the computer system contains the identifier of the recipient and that the identifier of the recipient corresponds to the identifier of the sender, and generating and storing at the computer system a partial mail object from the received email message using the address information in the database for the sender if it is determined at the computer system that the identifier of the recipient is not contained in the database at the computer system or if it is determined at the computer system that the identifier of the recipient does not correspond to the identifier of the sender.

14. The method of claim 13, wherein the receiving step includes the substep of:

generating an identifier for the email message at the computer system.

15. The method of claim 14, wherein the partial mail object is stored at the computer system using the identifier for the email message.

16. The method of claim 15 further comprising the step of:

sending from the computer system to the sender a return email message corresponding to the partial mail object and indicating that it was determined at the computer system that the identifier of the recipient is not contained in the database or that the identifier of the recipient does not correspond to the identifier of the sender.

17. The method of claim 16, wherein the return email message from the computer system to the sender includes the identifier for the email message.

18. The method of claim 17 further comprising the steps of:

the email message constituting a first email message, receiving a second email message from the sender after the return of the first email message to the sender; and determining at the computer system whether the second email message corresponds to the return email message.

19. The method of claim 18, wherein the determining step includes the substep of:

locating at the computer system in the second email message the identifier for the email message.

20. The method of claim 18 further comprising the step of:

combining at the computer system portions of the first mail message returned to the sender with portions of the second mail message to form a complete email message for transmission by the computer system to the receiving station.

21. The method of claim 20 wherein the computer system includes a printer, the combining step including the substep of:

transmitting the complete email message from the computer system to the receiving station; and printing the email object on a printer at the receiving station.

22. A computer system for generating mail objects from email messages, the computer system comprising;

a database containing identifiers for senders of email messages, identifiers for corresponding recipients of mail objects, and address information for both the senders and recipients;

means for receiving email messages from senders;

means for locating in the database the identifiers for the senders and the identifiers for the recipients specified in the email messages; and means for generating mail objects from the email messages using the address information in the database for the senders and for the recipients, wherein the computer system includes a printer, and wherein the generating means comprises;

means for printing the mail object on the printer.

23. A computer system for generating mail objects from email messages, the computer system comprising:

a database containing identifiers for senders of email messages, identifiers for corresponding recipients of mail objects, and name and address information for both the senders and the recipients;

means receiving an email message from a sender, including an identifier of the sender and an identifier of a recipient;

means for locating in the database the identifier of the sender;

means for locating in the database the identifier of the recipient; and means for generating a mail object from the received email message using the address information in the database for the sender and for the recipient, and including a printer for printing the mail object.

24. A computer system for generating mail objects from email messages, the computer system comprising:

a database containing identifiers for senders of email messages, identifiers for corresponding recipients of mail objects, and address information for both the senders and the recipients;

means for receiving an email message from a sender, including an identifier of the sender and an identifier of a recipient;

means for locating in the database the identifier of the sender and the identifier of the recipient;

means for determining whether the identifier of the sender in the database and the identifier of the recipient in the database correspond to the identifiers of the sender and the recipient in the email message; and generating a mail object from the received email message using the address information in the database for the sender and for the recipient if it is determined that the identifier of the sender and the identifier of the recipient correspond to the identifiers of the sender and the recipient in the email message.

25. The computer system of claim 24 including a printer for printing the mail object.

26. A computer system for generating mail objects from email messages, the computer system comprising:

a database containing identifiers for senders of email messages, identifiers for corresponding recipients of mail objects, and address information for both the senders and the recipients;

means for receiving an email message;

means for extracting from the received email message an identifier of a sender and an identifier of a recipient;

means for locating in the database the identifier of the sender;

means for determining whether the database contains the identifier of the recipient and whether the identifier of the recipient and the identifier of the sender correspond to the identifiers of the sender and the recipient in the email message; and means for generating a mail object from the received email message using the address information in the database for the sender and for the recipient if it is determined in the database that the identifier of the recipient and the identifier of the sender correspond to the identifier of the sender and the recipient in the email message.

27. The computer system of claim 26 including a printer for printing the mail object.

28. A computer system for generating mail objects from email messages, the computer system comprising:
a database containing identifiers for senders of email messages, identifiers for corresponding recipients of mail objects, and name and address information for both the senders and the recipients;
means for receiving an email message;
means for extracting from the received email message an identifier of a sender and an identifier of a recipient;
means for locating in the database the identifier of the sender;
means for determining whether the database contains the identifier of the recipient and whether the identifier of the recipient and the identifier of the sender correspond to the identifiers of the sender and the recipient in the email message; and
means for generating and storing a partial mail object from the received email message using the address information in the database for the sender if it is determined that the identifier of the recipient is not contained in the database or if the identifier of the recipient and the identifier of the sender do not correspond to the identifiers of the sender and the recipient in the email message.

29. The computer system of claim 28, wherein the receiving means includes:
means for generating an identifier for the email message.

30. The computer system of claim 29, wherein the partial mail object is stored using the identifier for the email message.

31. The computer system of claim 30 further comprising:
means for sending to the sender a return email message corresponding to the partial mail object and indicating that it was determined that the identifier of the recipient is not contained in the database or that the identifier of the recipient the identifier of the sender do not correspond to the identifiers of the sender and the recipient in the email message.

32. The computer system of claim 31, wherein the return email message includes the identifier for the email message.

33. The computer system of claim 32 further comprising:
the return email message constituting a first email message;
means for receiving a second email message from the sender; and
means for determining whether the second email message corresponds to the first email message.

34. The computer system of claim 33, wherein the determining means includes:
means for locating in the second email message the identifier for the second email message.

35. The computer system of claim 34 further comprising:
means for combining portions of the partial mail message with portions of the second email to form a complete mail message.

36. The computer system of claim 35 further comprising a printer for printing the mail object on the printer.

37. The computer system of claim 28 further comprising:
means for determining whether the database indicates that the sender is permitted to generate an email message.

38. In a method of generating and sending a message, the steps of:
receiving from a sender information identifying the sender of the message and the recipient of the message on a generalized basis and identifying the message,
providing a stored data base identifying the sender and the recipient previously identified by the sender on the generalized basis,
sending the message to a receiving station near the address of the recipient identified in the stored data base,
providing in the stored data base information indicating whether the sender has a financial balance sufficient to send the message to the recipient, and
sending the message to the receiving station near the address of the recipient when the stored data base indicates that the sender has a sufficient financial balance to send the message to the recipient.

39. In a method as set forth in claim 38, the steps of:
subtracting the cost of sending the message from the financial balance stored in the stored data base for the sender when the message is sent to the recipient identified in the stored data base.

40. In a method as set forth in claim 38 wherein
a central station receives the information identifying the sender and the recipient on the generalized basis and identifying the message and wherein
the central station provides the stored data base information identifying the sender and the specific recipient and wherein
the central station sends the message to the recipient identified in the stored data base at the central station.

41. In a method as set forth in claim 40 wherein
the central station stores information indicating whether the sender has a financial balance sufficient to send the message to the recipient and wherein
the central station sends the message to the recipient when the stored data base indicates that the sender has a sufficient financial balance to send the message to the recipient.

42. In a method as set forth in claim 41 wherein the central station subtracts the cost of sending the message from the financial balance stored in the stored data base for the sender when the central station sends the message to the recipient identified in the stored data base.

43. In a method of generating and sending messages by electronic mail, the steps of:
receiving from a sender information identifying the sender of the message, information identifying the recipient of the message and information identifying the message,
determining which, if any, of the identification of the sender, the identification of the recipient and the identification of the message is incomplete,
storing the information identifying the sender of the message, the information identifying the recipient of the message and the information identifying the message,
sending the message to the recipient when a determination is made that the information identifying the sender of the message, the information identifying the recipient of the message and the information identifying the message is complete, and
preventing the message from being sent to the recipient when a determination is made that at least one of the information identifying the sender of the message, the information identifying the recipient of the message and the information identifying the message is incomplete.

44. In a method of generating and sending messages by electronic mail, the steps of:

receiving from a sender information identifying the sender of the message, information identifying the recipient of the message and information identifying the message, determining which, if any, of the identification of the sender, the identification of the recipient and the identification of the message is incomplete, storing the information identifying the sender of the message, the information identifying the recipient of the message and the information identifying the message, sending the message to the recipient when a determination is made that the information identifying the sender of the message, the information identifying the recipient of the message and the information identifying the message is complete, thereafter receiving the incomplete portion of at least one of the information identifying the sender, the information identifying the recipient and the information identifying the message, and sending the message to the recipient when the incomplete portion of at least one of the information identifying the sender, the information identifying the recipient and the information identifying the message has been provided by the sender.

45. In a method of generating and sending messages by electronic mail, the steps of:

receiving from a sender information identifying the sender of the message, information identifying the recipient of the message and information identifying the message, determining which, if any, of the identification of the sender, the identification of the recipient and the identification of the message is incomplete, storing the information identifying the sender of the message, the information identifying the recipient of the message and the information identifying the message, sending the message to the recipient when a determination is made that the information identifying the sender of the message, the information identifying the recipient of the message and the information identifying the message is complete, the recipient being identified on a generalized basis in a data base for the sender, storing in the data base for the sender the identity of the recipient identified on the generalized basis by the sender, and sending the message to the recipient identified in the data base of the sender when a determination is made that the information identifying the sender, the information identifying the recipient and the information identifying the message are complete.

46. In a method of generating and sending messages by electronic mail, the steps of:

receiving from a sender information identifying the sender of the message, information identifying the recipient of the message and information identifying the message, determining which, if any, of the identification of the sender, the identification of the recipient and the identification of the message is incomplete, storing the information identifying the sender of the message, the information identifying the recipient of the message and the information identifying the message, and sending the message to the recipient when a determination is made that the information identifying the sender of the message, the information identifying the recipient of the message and the information identifying the message is complete, and identifying to the sender what in the information identifying the sender, the information identifying the recipient and the information identifying the message is determined to be incomplete thereby providing the sender with an opportunity to complete such information.

47. In a method as set forth in claim 46, the steps of:

thereafter receiving what is determined to be the incomplete portion of the at least one of the information identifying the sender, the information identifying the recipient and the information identifying the message, the recipient being identified on a generalized basis, storing in the database for the sender the identity of the recipient identified on a generalized basis by the sender, and sending the message to a receiving station near the recipient identified in the database for the sender when it is determined that the information identifying the sender, the information identifying the recipient and the information identifying the message are complete.

48. In a method as set forth in claim 47 wherein the steps of receiving, determining, storing and sending are provided at a central station.

49. In a method of generating and sending messages by electronic mail, the steps of:

receiving from a sender information identifying the sender of the message, information identifying the recipient of the message and information identifying the message, determining which, if any, of the identification of the sender, the identification of the recipient and the identification of the message is incomplete, storing the information identifying the sender of the message, the information identifying the recipient of the message and the information identifying the message, and sending the message to the recipient when a determination is made that the information identifying the sender of the message, the information identifying the recipient of the message and the information identifying the message is complete, and the steps of receiving, determining, storing and sending being provided at a central station.

50. In a method of generating and sending messages by electronic mail wherein a sender sends by electronic mail to a central station information identifying the sender, information identifying a recipient and information identifying a message, the central station receives the information sent by the sender, the central station provides a stored database indicating the identity and the address of the sender and the identity and the address of the recipient, the central station sends by electronic mail to a receiving station near the address of the recipient information disclosing the message and the identity and the address of the sender in the database and the identity and the address of the recipient in the database, and the receiving station receives the information disclosing the message and the identity and the address of the sender and the identity and the address of the recipient.

51. In a method as set forth in claim 50 wherein the stored database at the central station provides information relating to the financial balance of the sender at the central station and wherein the central station sends to the receiving station by electronic mail information disclosing the message and the identity and the address of the sender and the identity and the address of the recipient when the central station determines from its stored database that the financial balance of the sender at the central station is sufficient to cover the cost of sending the message.

52. In a method as set forth in claim 50 wherein the central station determines whether the information sent by the sender is complete and wherein the central station sends to the receiving station by electronic mail the information disclosing the message and the identity and the address of the sender and the identity and the address of the recipient when the central station determines that the information sent by the sender is complete.

53. In a method as set forth in claim 50 wherein the central station determines whether the information sent by the sender by electronic mail to the central station is complete and wherein the central station sends to the sender by electronic mail information indicating whether the information sent by the sender by electronic mail to the central station is complete and, if the information is not complete, indicating the additional information that the sender has to provide by electronic mail to the central station to complete the information sent by the sender by electronic mail to the central station.

54. In a method as set forth in claim 53 wherein the central station stores in the stored database the information set by the sender by electronic mail to the central station when the central station determines that such information is complete and wherein the sender sends to the central station additional information by electronic mail to complete the information previously sent by the sender by electronic mail to the central station and wherein the central station processes the additional information sent by the sender by electronic mail to the central station and the information previously sent by the sender by electronic mail to the central station and stored in the stored database to determine if such additional information and such stored information are complete and wherein the central station sends the stored information and the additional information by electronic mail to the receiving station when the central station determines that the stored information and the additional information are complete.

55. In a method as set forth in claim 54 wherein the stored database at the central station provides information relating to the financial balance of the sender at the central station and wherein the central station sends to the receiving station by electronic mail information disclosing the message and the identity and the address of the sender and the identity and the address of the recipient when the central station determines from its stored database that the financial balance of the sender at the central station is sufficient to cover the cost of sending the message.

56. In a method of generating and sending a message by electronic mail wherein a sender sends by electronic mail to a central station information identifying a message, information identifying the sender of the message and information identifying the recipient of the message and wherein the central station receives the information identifying the message, the information identifying the sender of the message and the information identifying the recipient of the message and determines which, if any, of the information identifying the sender of the message, the information identifying the message and the information identifying the recipient of the message is incomplete and wherein the central station sends by electronic mail to the sender the determination by the central station as to which, if any, of the information identifying the sender of the message, the information identifying the message and the information identifying the recipient of the message is incomplete and wherein the sender sends by electronic mail to the central station additional information to complete the incomplete portion of the information identifying the sender, the information identifying the message and the information identifying the recipient of the message and wherein the central station receives the additional information transmitted by electronic mail from the sender and determines whether the additional information completes the incomplete portion of the information identifying the sender of the message, the information identifying the message and the information identifying the recipient of the message.

57. In a method as set forth in claim 56 wherein the central station sends by electronic mail to a branch station near the address of the recipient the information disclosing the sender of the recipient, the information identifying the message and the information identifying the recipient of the message when the central station determines that all of such information is complete.

58. In a method as set forth in claim 56 wherein the central station discontinues the storage of the information identifying the sender of the message, the information identifying the recipient and the information identifying the message when the central station fails to receive, within a particular period of time after the storage of such information, any additional information to complete the incomplete portion of the information identifying the sender of the message, the information identifying the message and the information identifying the recipient of the message.

59. In a method as set forth in claim 57 wherein the receiving station receives by electronic mail from the central station the information identifying the sender of the message, the information identifying the message and the information identifying the recipient of the message and wherein the receiving station provides for a mailing to the recipient of the information identifying the message and the information identifying the sender of the message when the receiving station receives such information by electronic mail from the central station.

60. In a method as set forth in claim 59 wherein the central station discontinues the storage of the information identifying the sender of the message, the information identifying the recipient of the message and the information identifying the message when the central station fails to receive, within a particular period of time after the storage of such information, any additional information to complete the incomplete portion of the information identifying the sender of the message, the information identifying the recipient of the message and the information identifying the message.

61. In a method of generating and sending a message by electronic mail wherein a sender sends by electronic mail to a central station information identifying a message, information identifying the sender of the message and information identifying the recipient of the message and wherein the central station receives the information identifying the message, the information identifying the sender of the message and the information identifying the recipient of the message and determines which, if any, of the information identifying the message, the information identifying the sender of the message and the information identifying the recipient of the message is incomplete, and wherein the central station provides a control number to the information identifying the message, the information identifying the sender of the message and the information identifying the recipient of the message and wherein the central station sends the control number by electronic mail to the sender and also sends by electronic mail to the sender, with such control number, the determination by the central station as to which, if any, of the information identifying the message, the information identifying the sender of the message and the information identifying the recipient of the message is incomplete.

62. In a method as set forth in claim 61 wherein the central station stores in a database the control number and, with the control number, the information identifying the message, the information identifying the sender of the message and the information identifying the recipient of the message and wherein the central station eliminates from the database the control number and, with the control number, the information identifying the message, the information identifying the sender of the message and the information identifying the recipient of the message when the central station determines that such information is incomplete and when the sender fails to send additional information relating to such message, the sender of the message and the recipient of the message by electronic mail to the central station within a particular time after such storage.

63. In a method as set forth in claim 61 wherein the sender sends by electronic mail, with the control number, to the central station additional information to complete the incomplete portions of the information identifying the message, the information identifying the sender of the message and the information identifying the recipient of the message when the sender has learned by electronic mail from the central station what portions of the information identifying the message, the information identifying the sender of the message and the information identifying the recipient of the message are incomplete.

64. In a method as set forth in claim 63 wherein the central station stores in a database the control number and, with the control number, the information identifying the message, the information identifying the sender of the message and the information identifying the recipient of the message and wherein the central station receives the control number by electronic mail from the sender and, with the control number, the additional information provided by the sender and wherein the central station determines if such additional information, when combined with the information stored in the database with such control number, completes the information identifying the message, the information identifying the sender of the message and the information identifying the recipient of the message.

65. In a method as set forth in claim 63 wherein the central station stores in a database information constituting a financial balance of the sender at the central station and wherein the central station sends by electronic mail to the sender information with the control number to indicate whether the sender has a sufficient cash balance at the central station for the central station to send the message by electronic mail for reception by the recipient.

66. In a method as set forth in claim 63 wherein the central station stores in a database information constituting a financial balance of the sender at the central station and wherein the central station sends by electronic mail to the sender information with the control number to indicate whether the sender has a sufficient cash balance at the central station for the central station to send the message by electronic mail for reception by the recipient, the sender of the message provides by electronic mail, with the control number, for an additional financial balance to be inserted into the financial balance in the database of the sender when the sender receives by electronic mail from the central station information that the financial balance of the sender is insufficient to cover the cost for the central station to sent the message to the recipient and wherein the central station stores in the database the control number and, with the control number, the information identifying the message, the information identifying the sender of the message and the information identifying the recipient of the message and wherein the central station eliminates from the database the control number and, with the control number, the information identifying the message, the information identifying the sender of the message and the information identifying the recipient of the message when the central station determines that such information is incomplete and when the sender fails to send additional information relating to such message, the sender of the message and the recipient of the message by electronic mail to the central station within a particular time after such storage.

67. In a method of generating and sending a message by electronic mail wherein a sender sends by electronic mail to a central station information identifying a message, information identifying the sender of the message and information identifying the recipient of the message and wherein the central station receives the information identifying the message, the information identifying the sender of the message and the information identifying the recipient of the message and wherein the central station provides a control number to the received message and wherein the central station determines whether it has sufficient information concerning the sender, the recipient and the message to send the message to the recipient and wherein the central station sends the control number to the sender of the message and an indication to the sender as to whether or not the central station has sufficient information concerning the sender, the recipient and the message to send the message to the recipient and wherein the central station sends the message and the identity of the sender and the recipient to a receiving station near the recipient, when the central station determines that it has sufficient information concerning the sender, the recipient and the message, for the mailing of such information from the receiving station to the recipient.

68. In a method as set forth in claim 67 wherein the central station determines if the sender has a financial balance in the sender's account with the central station to send the message to the receiving station near the address of the recipient and wherein the central station sends the message and the identities of the sender and the recipient to such receiving station when the central station determines that the sender has a sufficient balance in the sender's account with the central station and when the central station determines that it has sufficient information concerning the sender, the recipient and the message to send the message to the receiving station.

69. In a method as set forth in claim 68 wherein upon determining that there is an insufficient balance in the account of the sender with the central station, the central station sends a message to the sender that the sender has an insufficient financial balance in the sender's account with the central station for the central station to send the message to the receiving station and that the sender will send the message to the receiving station when the sender has provided a sufficient balance in the account of the sender with the central station for the central station to send the message and the identities of the sender and the receiver to the receiving station.

70. In a method as set forth in claim 69 wherein the central station stores the information identifying the message, the information identifying the sender and the information identifying the recipient when the central station determines that the financial balance in the account of the sender at the central station is insufficient for the central station to send the message to the receiving station and wherein the central station sends the message and the identities of the sender and the receiver to the receiving station when the sender has provided a sufficient balance in the financial account with the central station for the central station to send the message and the identities of the sender and the receiver to the receiving station.

71. In a method as set forth in claim 67 wherein the central station determines whether the information identifying the message, the information identifying the sender and the information identifying the recipient are complete and wherein upon determining that at least one of the information identifying the message, the information identifying the sender or the information identifying the recipient is incomplete, the central station sends, with the control number, an indication that such information is incomplete and an indication of the information that the sender has to send to the central station to complete such information.

72. In a method as set forth in claim 71 wherein the central station stores in a database the information identifying the message, the information identifying the sender and the information identifying the recipient when the central station determines at least one of such information is incomplete and wherein the central station discontinues the storage in the database of the information identifying the message, the information identifying the sender and the information identifying the recipient when the sender fails to send additional information relating to the incomplete information identifying the message, the information identifying the sender and the information identifying the recipient within a particular time after such storage.

73. In a method as set forth in claim 71 the steps of:

determining at the central station whether the central station has sufficient information concerning the message and the identities of the sender and the recipient to send the message and the identities of the sender and the recipient to the receiving station, and sending from the central station by electronic mail to the sender the control number and an identity of what information is determined by the central station to be missing from the message and the identities of the sender and the recipient to prevent the central station from sending the message and the identities of the sender and the recipient to the receiving station, and sending the message and the identities of the sender and the recipient from the central station by electronic mail to the receiving station when the central station receives additional information with the control number by electronic mail toward completing the message and the identities of the sender and the recipient and the central station determines that such additional information completes the message and the identities of the sender and the recipient.

74. In a method of generating and sending a message by electronic mail, the steps of:

receiving from a sender at a central station by electronic mail information identifying a message, the sender of the message and the recipient of the message, the recipient being identified by an abbreviated designation other than the name and address of the recipient, storing in a database at the central station the name and address of the recipient of the message on the basis of the abbreviated designation of the recipient in connection with the identity of the sender, retrieving from the database at the central station the name and address of the recipient on the basis of the abbreviated designation in connection with the identity of the sender, and sending the message and the identity of the sender and the name and address of the recipient, as retrieved from the database from the central station by electronic mail to a receiving station near the address of the recipient for mailing of the message from the receiving station to the recipient.

75. In a method as set forth in claim 74, the steps of:

providing at the central station a control number for the message and the sender and the recipient, and sending from the central station to the sender by electronic mail the control number and a confirmation that the central station has received the message and the identity of the sender and the identity of the recipient and that the central station will be sending the message and the identity of the sender and the identity of the recipient by electronic mail to the receiving station, and sending the control number from the central station by electronic mail to the receiving station with the message and the identities of the sender and the recipient.

76. In a method as set forth in claim 74, the step of:

removing from the database at the central station the control number and the message and the identities of the sender and the recipient when the central station fails to receive from the sender by electronic mail any additional information to complete the message and the identities of the sender and the recipient within a particular period of time after the central station sends to the sender by electronic mail the control number and the identity of what information is determined by the central station to be missing from the message and the identities of the sender and the recipient to prevent the central station from sending the message and the identities of the sender and the recipient to the receiving station.

77. In a method as set forth in claim 74, the step of:

adding to the database at the central station, for the control number of the message from the sender, the additional information sent by the sender by electronic mail to the central station, with the control number, toward completing the message and the identities of the sender and the recipient for sending from the central station by electronic mail to the receiving station.

78. In a method of generating and sending a message by electronic mail, the steps of:

receiving at a central station by electronic mail from a sender a particular message including the context of the particular message and the identities of the sender and the recipient, providing an individual control number for the message at the central station, storing the individual control number and the message in a queue with other control numbers and messages associated with such control numbers, and retrieving each of the control numbers and the associated message in sequence from the queue in a chronological order related to the order in which the control numbers and the associated messages are stored in the queue, and sending the retrieved individual control number and the associated message from the central station to a receiving station near the address of the recipient of the associated message for mailing by the receiving station to the recipient when such individual control number and such associated message are retrieved from the queue.

79. In a method as set forth in claim 78, the steps of:

determining at the central station whether the message associated with the individual control number is complete at the time that the individual control number and the associated message are received by the central station by electronic mail from the sender, and when the central station determines that the message associated with the individual control number is incomplete, sending from the central station by electronic mail to the sender an indication that the associated message is incomplete and an indication of what causes the associated message to be incomplete.

80. In a method as set forth in claim 79, the step of:

purging the individual control number and the associated message from the queue when the central station fails to receive by electronic mail from the sender the individual control number and additional information toward completing the message associated with the individual control number.

81. In a method as set forth in claim 78, the steps of:

storing in a database at the central station the financial balance in the account of the sender of the message with the individual control number, determining at the central station whether the financial balance in the account of the sender with the individual control number is sufficient to pay for the sending of the message from the central station to the receiving station, and sending the message with the individual control number from the central station to the receiving station when the central station determines that the financial balance in the account of the sender with the individual control number is sufficient to pay for the sending of the message.

82. In a method as set forth in claim 81, the steps of:

sending by electronic mail from the central station to the sender an indication that the financial balance in the account of the sender at the central station is insufficient to pay for the sending of the message from the central station by electronic mail to the receiving station, and receiving at the central station by electronic mail from the sender a deposit in the financial account of the sender at the central station sufficient to pay for the sending of the message with the individual account number from the central station by electronic mail to the receiving station, and sending the message with the individual control number from the central station by electronic mail to the receiving station when the central station determines that it has a financial balance in the account of the sender sufficient for the sender to pay for the sending of the message with the individual control number by the central station by electronic mail to the receiving station.

83. In a method as set forth in claim 80, determining at the central station whether the message associated with the individual control number is complete at the time that the individual control number and the associated message are received by the central station by electronic mail from the sender, and when the central station determines that the message associated with the individual control number is incomplete, sending from the central station by electronic mail to the sender an indication that the associated message is incomplete and an indication of what causes the associated message to be incomplete, purging the individual control number and the associated message from the queue when the central station fails to receive by electronic mail from the sender after a particular period of time the individual control number and additional information toward completing the message associated with the individual control number.

84. In a method of generating and sending a message by electronic mail, the steps of:

sending by electronic mail from a sender to a central station a request indicating a brief identification of the type of the message, a brief identification of the sender and a brief identification of the recipient, storing in a first database at the central station the message indicated by the brief identification of the type of message, storing in a second database at the central station the name and address of the sender as indicated by the brief identification, storing in a third database at the central station the name and address of the recipient as indicated by the brief identification of the sender and the recipient, retrieving the message from the first database as indicated by the brief identification of the message, the name and address of the sender from the second database as indicated by the brief identification of the sender and the name and address of the recipient from the third database as indicated by the brief identification of the sender and the recipient, and sending the retrieved message, the retrieved name and address of the sender and the retrieved name and address of the recipient from the central station by electronic mail to a receiving station near the address of the recipient.

85. In a method as set forth in claim 84, the steps of:

receiving at the receiving station the message, the identity and address of the sender and the identity and address of the recipient, and providing at the receiving station for the mailing of the message from the receiving station to the recipient of the message at the address of the recipient.

86. In a method as set forth in claim 84, receiving at the receiving station the message, the identity and the address of the sender and the identity and the address of the recipient, and providing at the receiving station for the sending of the message from the receiving station to the recipient of the message, determining at the central station whether the message is incomplete and, if so, what causes it to be incomplete, sending by electronic mail from the central station to the sender an indication that the request is incomplete and, if incomplete, what causes the message to be incomplete, thereafter sending from the sender by electronic mail to the central station information to complete the request, receiving at the central station by electronic mail from the sender the information to complete the request, thereafter determining at the central station if the request is now complete, and if the request is now complete, sending the message, the name and the address of the sender and the name and the address of the recipient from the central station to the receiving station office.

87. In a method as set forth in claim 84, determining at the central station whether the message is incomplete and, if so, what causes it to be incomplete, and sending from the central station by electronic mail to the sender an indication that the request is incomplete and, if incomplete, what causes the message to be incomplete, and thereafter sending from the sender by electronic mail to the central station information to complete the request.

88. In a method as set forth in claim 87, the steps of:

receiving at the central station by electronic mail from the sender the information to complete the request, thereafter determining at the central station if the request is now complete, and if the central station determines that the request is now complete, sending the message, the name and address of the sender and the name and address of the recipient to the receiving station.

89. In a method as set forth in claim 84, the steps of:

retaining in a fourth database at the central station a balance in the account of the sender, determining at the central station if the financial balance of the sender in the fourth database at the central station is sufficient to pay for the cost of sending the message by electronic mail from the central station to the receiving station, and if so, sending the message, the identity and address of the sender and the identity and address of the recipient from the central station by electronic mail to the receiving station.

90. In a method as set forth in claim 89, the steps of:

if the central station determines that the financial balance in the account of the sender at the central station is insufficient to pay for the cost of sending the message by electronic mail from the central station to the receiving station, sending an indication of this from the central station by electronic mail to the sender.

91. In a method as set forth in claim 90, thereafter sending from the sender by electronic mail to the central station sufficient funds, when added to the funds indicated in the fourth database relating to the financial balance of the account of the sender at the central station, to pay for the cost of sending the message from the central station by electronic mail to the receiving station, and thereafter sending the message, the identification and the address of the sender and the identification and address of the recipient from the central station by electronic mail to the receiving station.

92. In a method as set forth in claim 7, the step of:

sending the message and the identities of the sender and the recipient from the central station by electronic mail to a receiving station near the recipient when the request from the sender is entered in the transmit queue.

93. In a method of generating and sending messages by electronic mail, the steps of:

receiving at a central station from a sender by electronic mail a request for the central station to send by electronic mail a message from the sender to a recipient identified by the sender in the request, determining at the central station whether the request from the sender is in sufficient detail for the central station to send the message to the recipient and to indicate to the recipient that the message is from the sender, if the determination at the central station is that the request from the sender is not in sufficient detail, entering the request from the sender in a transaction queue at the central station and entering in the transaction queue the information that is needed to provide the request in sufficient detail for the central station to send the message to the recipient, and sending from the central station by electronic mail to the sender a request for the information that is determined by the central station to be needed to provide the request in sufficient detail for the central station to send the message to the recipient.

94. In a method as set forth in claim 93, the steps of:

providing at the central station the request from the sender with an individual control number, entering the individual control number into the transaction queue at the central station with the request from the sender when the central station determines that there is insufficient information in the request to send the request to the receiving station, entering other request from other senders into the transaction queue at the central station with control numbers identifying such other requests when the central station determines that such other requests have insufficient information for the central station to send messages to recipients identified in such other requests, and sequentially sending messages identified by the request from the sender and the requests from the other senders to the sender and to the other senders in the same order that such request from the sender and the requests from the other senders are entered into the transaction queue to indicate to the sender the information that the sender has to send by electronic mail to the central station to complete the request from the sender and to indicate to the other senders the information that such other senders have to send by electronic mail to the central station to complete such other messages.

95. In a method as set forth in claim 86, if the determination at the central station is that the request from the sender is in sufficient detail to send the request to the receiving station, entering the request from the sender into a transmit queue and sending from the central station by electronic mail to the sender, when the request from the sender is entered in the transmit queue, an indication that the request from the sender has been approved, providing at the central station the request from the sender with an individual control number, entering the individual control number into the transmit queue at the central station with the request from the sender, entering other requests from other senders into the transmit queue at the central station with control numbers identifying such other requests when the central station determines that such other requests have sufficient information for the central station to send messages to recipients identified in such other requests, and sequentially sending messages identified by the request from the sender and the requests from the other senders to the receiving station near the address of the recipient identified in the request and to receiving stations near the addresses of recipients identified in the other requests in the same order that such request from the sender and the requests from the other senders are entered into the transmit queue.

96. In a method as set forth in claim 93, the steps of:

if the determination at the central station is that the request from the sender is in sufficient detail, entering the request from the sender into a transmit queue, and sending from the central station by electronic mail to the sender, when the request from the sender is entered in the transmit queue, an indication that the request from the sender has been approved.

97. In a method as set forth in claim 96, the steps of:

providing at the central station the request from the sender with an individual control number, entering the individual control number into the transmit queue at the central station with the request from the sender, entering other requests from other senders into the transmit queue at the central station with control numbers identifying such other requests when the central station determines that such other requests have sufficient information for the central station to send messages to recipients identified in such other requests, and sequentially sending messages identified by the request from the sender and the requests from the other senders to the receiving station near the address of the recipient identified in the request and to receiving stations near the addresses of the recipients identified in the other requests in the same order that such request from the sender and the requests from the other senders are entered into the transmit queue.

98. In a method of generating and sending a message by electronic mail, the steps of:

receiving at a central station from a sender a request to send a message by electronic mail to a recipient, determining at the central station if the request from the sender is sufficiently complete for the central station to send the message by electronic mail to a receiving station near the address of the recipient, storing at the central station the name and address of the recipient and an abbreviated identification previously identified by the sender for such recipient, substituting the name and address of the recipient for the abbreviated identification of the recipient if such abbreviated identification of the recipient is used in the request, sending by electronic mail from the central station to the receiving station, for printing at the receiving station, the message identified in the request when the central station determines that the request from the sender is sufficiently complete for the central station to send the message by electronic mail to the receiving station, and sending by electronic mail from the central station to the receiving station, for printing at the receiving station, an envelope with the name and address of the recipient in the place on the envelope where an addressee is ordinarily identified and with the name and address of the sender in the place on the envelope where the addressor is ordinarily identified.

99. In a method as set forth in claim 98, the steps of:

providing at the central station a print queue in which the request of the sender to send the message to the recipient and the requests of other senders to send messages to other recipients are stored in the same order as the order in which the central station receives the request from the sender and the other requests from the other senders, and sending by electronic mail from the central station, to receiving stations nearest the recipients of the message from the sender and the messages from the other senders, the message from the sender and the messages from the other senders in the same order as the order in which the central station receives the request from the sender and the other requests from the other senders in the print queue.

100. In a method as set forth in claim 95, the steps of:

sending from the central station by electronic mail to the sender an indication of any additional information that the sender has to send by electronic mail to the central station to make the request sufficiently complete for the central station to send the message by electronic mail to the receiving station, thereafter receiving at the central station by electronic mail from the sender the additional information to make the request sufficiently complete for the central station to send the message to the receiving station, and thereafter sending from the central station by electronic mail to the receiving station the message and the envelope with the name and address of the recipient as the addressee and the name and address of the sender as the addressor.

101. In a method as set forth in claim 98 wherein the request from the sender is provided with a control number and wherein the central station sends the control number of the request by electronic mail to the receiving station with the message and with the envelope printed with the name and address of the recipient as the addressee and with the name and address of the sender as the addressor and wherein the central station sends by electronic mail to the sender an indication that the central station has approved the request of the sender for the central station to send the message by electronic mail to the receiving station.

102. In a method as set forth in claim 101, providing at the central station a print queue in which the request of the sender to send the message to the recipient and the requests of other senders to send messages to other recipients are stored in the same order as the order in which the central station receives the request from the sender and the other requests from the other senders, and sending by electronic mail from the central station, to receiving stations nearest the address of the recipient of the message from the sender and the recipients of the messages from the other senders, the message from the sender and the messages from the other senders in the same order as the order in which the central station provides the request from the sender and the other requests from the other senders in the print queue, if the request from the sender is incomplete, sending from the central station by electronic mail to the sender an indication of any additional information that the sender has to send by electronic mail to the central station to make the request sufficiently complete for the central station to send the message by electronic mail to the receiving station, thereafter receiving at the central station by electronic mail from the sender the additional information to make the request sufficiently complete for the central station to send the message by electronic mail to the receiving station, and thereafter sending to the receiving station the message and the envelope with the name and address of the recipient as the addressee and the name and address of the sender as the addressor.

\* \* \* \* \*